(12) United States Patent
Hamamura et al.

(10) Patent No.: US 12,540,279 B2
(45) Date of Patent: Feb. 3, 2026

(54) LIQUID CRYSTAL ELEMENT AND EMULSION COMPOSITION

(71) Applicant: MITSUBISHI CHEMICAL CORPORATION, Tokyo (JP)

(72) Inventors: Tomofumi Hamamura, Tokyo (JP); Hideki Sato, Tokyo (JP); Makoto Yanagie, Tokyo (JP); Katsutoshi Nakamura, Tokyo (JP); Takashi Komori, Tokyo (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 19/187,844

(22) Filed: Apr. 23, 2025

(65) Prior Publication Data

US 2025/0250487 A1  Aug. 7, 2025

Related U.S. Application Data

(63) Continuation of application No. PCT/JP2023/038260, filed on Oct. 24, 2023.

(51) Int. Cl.
| | | |
|---|---|---|
| *G02F 1/1333* | (2006.01) | |
| *C09K 19/54* | (2006.01) | |
| *C09K 19/60* | (2006.01) | |
| *G02F 1/1334* | (2006.01) | |
| *C09K 19/52* | (2006.01) | |

(52) U.S. Cl.
CPC .......... *C09K 19/544* (2013.01); *C09K 19/601* (2013.01); *C09K 19/603* (2013.01); *G02F 1/1334* (2013.01); *C09K 2019/528* (2013.01); *C09K 2219/03* (2013.01)

(58) Field of Classification Search
CPC ............................. G02F 1/1333; C09K 19/38
See application file for complete search history.

(56) References Cited

U.S. PATENT DOCUMENTS

2023/0399567 A1  12/2023  Sato
2025/0250487 A1*  8/2025  Hamamura .......... C09K 19/603

FOREIGN PATENT DOCUMENTS

| JP | H07-504763 A | 5/1995 |
| JP | 3832908 B2 * | 10/2006 |
| WO | 93/18431 A1 | 9/1993 |
| WO | 2021/166746 A1 | 8/2021 |
| WO | 2022/186062 A1 | 9/2022 |

OTHER PUBLICATIONS

International Search Report (PCT/ISA/210) issued in PCT Application No. PCT/JP2023/038260 dated Dec. 19, 2023.
D.A.Higgins, "Probing the Mesoscopic Chemical and Physical Properties of Polymer-Dispersed Liquid Crystals," Advanced Materials, 2000, 12, No. 4.

* cited by examiner

*Primary Examiner* — Geraldina Visconti
(74) *Attorney, Agent, or Firm* — Morgan, Lewis & Bockius LLP

(57) ABSTRACT

A liquid crystal element includes two substrates with a transparent conductive film, the substrates being arranged such that transparent conductive films face each other, and a liquid crystal-polymer composite film which is sandwiched between the two substrates with a transparent conductive film, in which the liquid crystal-polymer composite film contains an acetylene alcohol.

24 Claims, No Drawings

LIQUID CRYSTAL ELEMENT AND EMULSION COMPOSITION

CROSS-REFERENCE TO RELATED APPLICATION

Priority is claimed on Japanese Patent Application No. 2022-170454, filed Oct. 25, 2022, the content of which is incorporated herein by reference.

BACKGROUND OF THE INVENTION

Technical Field

The disclosure relates to a liquid crystal element and an emulsion composition. Specifically, the disclosure relates to a liquid crystal element capable of switching between a transparent state and a scattering state, and an emulsion composition that can be used to form the liquid crystal element.

Description of Related Art

In recent years, there has been an increasing demand for smart glass that can electrically switch the glass transparency. As light controlling materials used for smart glass, liquid crystal methods, electrochromic methods, Suspend Particle Device (SPD) methods, and the like have been proposed. Among the above, the liquid crystal methods have attracted attention as a result of having an overwhelmingly short response time and not causing users to feel stress.

Among liquid crystal methods, Polymer Dispersed Liquid Crystals (PDLC) are widely known (Non Patent Document 1). PDLCs have a structure where a liquid crystal-polymer composite film, in which particulate liquid crystals are dispersed in a polymer matrix, is sandwiched between two transparent conductive substrates.

Among PDLCs, normal mode driving is the most common. In a state where no voltage is applied to PDLCs in normal mode driving, the liquid crystal molecules are aligned along the wall surfaces of the polymer matrix, resulting in a mismatch in the refractive index between the liquid crystal region and the polymer matrix. This mismatch causes light scattering and cloudiness, functioning as a visual barrier. Meanwhile, when a voltage is applied to PDLCs, the liquid crystal molecules are aligned in the electric field direction, resulting in a match in the refractive index between the liquid crystal region and the polymer matrix, allowing light to pass through and creating transparency.

PDLCs have been put to practical use as light control shutters for purposes such as design and privacy protection in windows, doors, partitions, and the like of vehicles such as trains and automobiles and buildings such as business buildings and hospitals. In addition, PDLCs are also used as display devices that display characters and figures.

As a result of the flexibility of PDLCs which derives from the above-described liquid crystal-polymer composite film structure, it is possible to make PDLCs into film elements. In addition, it is possible to cut and mold the film elements. Taking advantage of these characteristics, it is possible for users to easily carry out installation involving attachment to glass.

In recent years, with the growing trend toward energy conservation, attempts have been made to use smart glass in windows and control the intensity of solar radiation entering a room to reduce the heating and cooling load. Meanwhile, in the case of PDLCs, although it is possible to switch between light scattering and no light scattering, most of the scattering is forward scattering and thus the light passes through the element. Therefore, it is almost impossible to control the amount of transmitted light and it is not possible to contribute to energy conservation.

Patent Document 1 discloses a liquid crystal element that has a high visible light transmittance change range (dynamic range) as a result of using a liquid crystal component having a predetermined dielectric anisotropy and refractive index anisotropy as a liquid crystal component in a liquid crystal composition including a liquid crystal component and a dichroic dye and increasing the NI point (nematic phase-isotropic phase transition temperature), in which the dynamic range is maintained even after driving at high temperatures.

CITATION LIST

Patent Document

Patent Document 1: PCT International Publication No. WO2022/186062

Non Patent Document

Non Patent Document 1: D. A. Higgins, Advanced Materials 2000, 12, No. 4

SUMMARY OF INVENTION

PDLCs are expected to be used in applications requiring durability at high temperatures such as, for example, smart windows for automobiles, and there is a demand for improved durability at high temperatures. However, both the liquid crystal elements of Patent Document 1 and Non Patent Document 1 have insufficient durability at high temperatures.

Solution to Problem

The present inventors discovered that the durability of liquid crystal elements at high temperatures is improved by containing an acetylene alcohol in a liquid crystal-polymer composite film, thereby completing the disclosure. That is, the gist of the disclosure is as follows.

[1] A liquid crystal element comprising: two substrates with a transparent conductive film, the substrates being arranged such that transparent conductive films face each other; and a liquid crystal-polymer composite film which is sandwiched between the two substrates with a transparent conductive film, wherein the liquid crystal-polymer composite film contains an acetylene alcohol.

[2] The liquid crystal element according to [1], wherein the liquid crystal-polymer composite film is switchable between a transparent state and a scattering state by applying a voltage.

[3] The liquid crystal element according to [1] or [2], wherein the liquid crystal-polymer composite film contains a polymer matrix and a liquid crystal composition, and the liquid crystal composition is present in the polymer matrix.

[4] The liquid crystal element according to any one of [1] to [3], wherein the liquid crystal composition contains a nematic liquid crystal or a chiral nematic liquid crystal as a liquid crystal component.

[5] The liquid crystal element according to [3] or [4], wherein a polymer forming the polymer matrix contains at least one selected from the group comprising polyurethane, polyacryl, polyvinyl alcohol, and modified products of polyurethane, polyacryl, and polyvinyl alcohol.

[6] The liquid crystal element according to any one of [3] to [5], wherein the liquid crystal composition contains a dichroic dye.

[7] The liquid crystal element according to [6], wherein the dichroic dye contains at least one selected from the group comprising anthraquinone dyes and azo dyes.

[8] The liquid crystal element according to [6] or [7], wherein a contained amount of the dichroic dye with respect to 100% by mass of the liquid crystal composition is 0.1% by mass or more and 20% by mass or less.

[9] The liquid crystal element according to any one of [1] to [8], wherein acetylene glycol is contained as the acetylene alcohol.

[10] The liquid crystal element according to any one of [1] to [9], wherein an HLB value of the acetylene alcohol is 5 to 15.

[11] The liquid crystal element according to any one of [1] to [10], wherein the liquid crystal-polymer composite film contains a surfactant other than the acetylene alcohol.

[12] The liquid crystal element according to [11], wherein an HLB value of a mixture of the acetylene alcohol and the surfactant is 5 to 15.

[13] The liquid crystal element according to any one of [1] to [12], wherein the substrates with a transparent conductive film are resin substrates.

[14] An emulsion composition comprising: a liquid crystal composition dispersed in a medium containing water, wherein the medium is a dispersion or solution of a polymer and an acetylene alcohol.

[15] The emulsion composition according to [14], wherein the liquid crystal composition contains a dichroic dye.

[16] The emulsion composition according to [15], wherein the dichroic dye contains at least one selected from the group comprising anthraquinone dyes and azo dyes.

[17] The emulsion composition according to [15] or [16], wherein a contained amount of the dichroic dye with respect to 100% by mass of the liquid crystal composition is 0.1% by mass or more and 20% by mass or less.

[18] The emulsion composition according to any one of [14] to [17], further comprising: acetylene glycol as the acetylene alcohol.

[19] The emulsion composition according to any one of [14] to [18], wherein an HLB value of the acetylene alcohol is 5 to 15.

[20] The emulsion composition according to any one of [14] to [19], further comprising: a surfactant other than the acetylene alcohol in the medium.

[21] The emulsion composition according to [20], wherein an HLB value of a mixture of the acetylene alcohol and the surfactant is 5 to 15.

[22] The emulsion composition according to any one of [14] to [21], wherein the polymer contains at least one selected from the group comprising polyurethane, polyacryl, polyvinyl alcohol, and modified products of polyurethane, polyacryl, and polyvinyl alcohol.

[23] A visual field blocking element using the liquid crystal element according to any one of [1] to [13], or the emulsion composition according to any one of [14] to [22].

The disclosure also has the following aspects.

[1] A liquid crystal-polymer composite film comprising an acetylene alcohol. [2] The liquid crystal-polymer composite film according to [1], wherein the liquid crystal-polymer composite film contains a liquid crystal composition and a polymer matrix.

[3] The liquid crystal-polymer composite film according to [1] or [2], wherein the acetylene alcohol is a compound represented by Formula 1 or Formula 2.

[4] The liquid crystal-polymer composite film according to any one of [1] to [3], wherein a contained amount of the acetylene alcohol is preferably 1% by mass or more and 5% by mass or less and more preferably 2% by mass or more and 4% by mass or less with respect to a mass of the liquid crystal-polymer composite film.

[5] The liquid crystal-polymer composite film according to any one of [1] to [4], further comprising: a liquid crystal composition, in which a contained amount of the liquid crystal composition is preferably 40% by mass or more and 70% by mass or less and more preferably 45% by mass or more and 60% by mass or less with respect to a mass of the liquid crystal-polymer composite film.

[6] The liquid crystal-polymer composite film according to any one of [1] to [5], further comprising: a liquid crystal composition including a liquid crystal component, in which a contained amount of the liquid crystal component is preferably 25% by mass or more and 60% by mass or less and more preferably 40% by mass or more and 55% by mass or less with respect to a mass of the liquid crystal-polymer composite film.

[7] The liquid crystal-polymer composite film according to any one of [1] to [6], further comprising: a liquid crystal composition including a chiral agent, in which a contained amount of the chiral agent is preferably 0.04% by mass or more and 4% by mass or less and more preferably 0.1% by mass or more and 2.5% by mass or less with respect to a mass of the liquid crystal-polymer composite film.

[8] The liquid crystal-polymer composite film according to any one of [1] to [7], further comprising: a liquid crystal composition including a dichroic dye, in which a contained amount of the dichroic dye is preferably 0.2% by mass or more and 10% by mass or less and more preferably 1.5% by mass or more and 6% by mass or less with respect to a mass of the liquid crystal-polymer composite film.

[9] The liquid crystal-polymer composite film according to any one of [1] to [8], further comprising: a polymer matrix, in which a contained amount of the polymer matrix is preferably 15% by mass or more and 45% by mass or less and more preferably 25% by mass or more and 40% by mass or less with respect to 100% by mass of the liquid crystal-polymer composite film.

[10] The liquid crystal-polymer composite film according to any one of [1] to [9], further comprising: a liquid crystal composition and a polymer matrix, in which a mass ratio, which is a ratio of a total mass of the liquid crystal composition with respect to a total mass of the polymer matrix and expressed as [liquid crystal composition]/[polymer matrix], is preferably 0.5 or more and 4 or less and more preferably 1 or more and 3 or less.

[11] An emulsion composition comprising: an acetylene alcohol.

[12] The emulsion composition according to [11], wherein the emulsion composition contains a liquid crystal composition, a polymer, and a medium including water.

[13] The emulsion composition according to [11] or [12], wherein the acetylene alcohol is a compound represented by Formula 1 or Formula 2.

[14] The emulsion composition according to any one of [11] to [13], wherein a contained amount of the acetylene alcohol is preferably 0.4% by mass or more and 5% by mass or less and more preferably 0.9% by mass or more and 4.5% by mass or less with respect to a mass of the emulsion composition.

[15] The emulsion composition according to any one of [11] to [14], further comprising: a liquid crystal composition, in which a contained amount of the liquid crystal composition is preferably 15% by mass or more and 40% by mass or less and more preferably 20% by mass or more and 35% by mass or less with respect to a mass of the emulsion composition.

[16] The emulsion composition according to any one of [11] to [15], further comprising: a liquid crystal composition including a liquid crystal component, in which a contained amount of the liquid crystal component is preferably 14% by mass or more and 36% by mass or less and more preferably 19% by mass or more and 32% by mass or less with respect to a mass of the emulsion composition.

[17] The emulsion composition according to any one of [11] to [16], further comprising: a liquid crystal composition including a chiral agent, in which a contained amount of the chiral agent is preferably 0.01% by mass or more and 2.2% by mass or less and more preferably 0.02% by mass or more and 1.8% by mass or less with respect to a mass of the emulsion composition.

[18] The emulsion composition according to any one of [11] to [17], further comprising: a liquid crystal composition including a dichroic dye, in which a contained amount of the dichroic dye is preferably 0.8% by mass or more and 4% by mass or less and more preferably 1.1% by mass or more and 3.6% by mass or less with respect to a mass of the emulsion composition.

[19] The emulsion composition according to any one of [11] to [18], further comprising: a polymer, in which a contained amount of the polymer is preferably 9% by mass or more and 30% by mass or less and more preferably 12% by mass or more and 23% by mass or less with respect to 100% by mass of the emulsion composition.

[20] The emulsion composition according to any one of [11] to [19], further comprising: a liquid crystal composition and a polymer, in which a mass ratio, which is a ratio of a total mass of the liquid crystal composition with respect to a total mass of the polymer and expressed as [liquid crystal composition]/[polymer], is preferably 0.5 or more and 4 or less and more preferably 1 or more and 3 or less.

[21] The emulsion composition according to any one of [11] to [20], further comprising: a medium including water, in which a contained amount of the medium including water is preferably 42% by mass or more and 59% by mass or less and more preferably 45% by mass or more and 56% by mass or less with respect to a mass of the emulsion composition.

[22] The emulsion composition according to any one of [11] to [21], further comprising: a medium including water, in which a contained amount of the water is preferably 42% by mass or more and 52% by mass or less and more preferably 44% by mass or more and 50% by mass or less with respect to a mass of the emulsion composition.

[23] The emulsion composition according to any one of [11] to [22], wherein a viscosity of the emulsion composition at 25° C. is preferably 10 mPa·s or more and 10,000 mPa·s or less, and more preferably 100 mPa·s or more and 2,000 mPa·s or less.

[24] A liquid crystal-polymer composite film formed from the emulsion composition according to any one of [11] to [22].

[25] A liquid crystal element, wherein the liquid crystal-polymer composite film according to any one of [1] to [10] and [24] is sandwiched between two substrates with a transparent conductive film and the two substrates with a transparent conductive film, the substrates being arranged such that the transparent conductive films face each other.

[26] A visual field blocking element using the liquid crystal element according to [25].

According to the disclosure, it is possible to provide a liquid crystal element having improved durability at high temperatures.

The liquid crystal element of the disclosure is useful for windows, screens, displays, and the like due to the above-described characteristics. For example, the liquid crystal element can be used as a visual field blocking element in the windows, partitions, and the like of buildings and vehicles. In addition, the liquid crystal element can be used as displays for advertising boards, show windows, computer terminals, projections, and the like.

DESCRIPTION OF EMBODIMENTS

The disclosure will be described in detail below. The following description is an example of an embodiment of the disclosure, the disclosure is not limited to the following contents of the description as long as the disclosure does not exceed the gist thereof, and the disclosure can be implemented in any modification to an extent not departing from the gist of the disclosure.

<<Liquid Crystal-Polymer Composite Film>>

The liquid crystal-polymer composite film of the disclosure contains an acetylene alcohol.

Examples of the liquid crystal-polymer composite film of the disclosure are the same as the liquid crystal-polymer composite film in the liquid crystal element described below.

<<Liquid Crystal Element>>

The liquid crystal element of the disclosure is provided with two substrates with a transparent conductive film, the substrates being arranged such that the transparent conductive films face each other, and a liquid crystal-polymer composite film which is sandwiched between the two substrates with a transparent conductive film, in which the liquid crystal-polymer composite film contains an acetylene alcohol.

[Mechanism]

In the liquid crystal element of the disclosure, the inclusion of an acetylene alcohol in the liquid crystal-polymer composite film increases stability by decreasing the surface tension of the liquid crystal composition and makes it possible to suppress the coalescence of the liquid crystal composition (that is, the particles of the liquid crystal composition aggregate and integrate) in high-temperature environments and to improve the durability of the liquid crystal element at high temperatures.

In addition, the acetylene alcohol also functions as a defoaming agent in the emulsion composition, thus making it possible to improve the stability and film-forming properties of the emulsion composition.

The liquid crystal element of the disclosure is capable of switching between a transparent state and a scattering state by applying a voltage.

By switching between the transparent state and the scattering state, it is possible to control the light transmittance.

By making the dielectric anisotropy ($\Delta\varepsilon$) of the liquid crystal component used in the disclosure positive, the obtained liquid crystal-polymer composite film is in a transparent state when a voltage is applied and in a scattering state when no voltage is applied, but the liquid crystal-polymer composite film may have a memory property that requires voltage application only when switching between the transparent state and the scattering state.

In the disclosure, the voltage refers to a direct current voltage, an alternating current voltage, a pulse voltage, or a combination thereof, having an effective value which is a threshold value or more.

In the disclosure, the transparent state represents the state of the liquid crystal-polymer composite film when the voltage is applied or when no voltage is applied, and the state in which the haze value of the liquid crystal-polymer composite film is small is defined as a transparent state when the voltage is applied or when no voltage is applied.

In addition, in the disclosure, the scattering state represents the state of the liquid crystal-polymer composite film when the voltage is applied or when no voltage is applied and the state in which the haze value of the liquid crystal-polymer composite film is large is defined as a scattering state when the voltage is applied or when no voltage is applied. In the scattering state, the liquid crystal-polymer composite film is in an opaque state, in contrast to the transparent state.

The haze value in the present specification is measured by the method specified in JIS K7136.

In addition, the total light transmittance in the present specification is measured by the method in JIS K7361-1.

In the present specification, light refers to visible light (wavelength 380 nm to 780 nm) and the total light transmittance is measured in the visible light region.

The haze value in the transparent state in the liquid crystal element of the disclosure is preferably 0% or more and less than 50%, more preferably 0% or more and 40% or less, even more preferably 0% or more and 20% or less, and particularly preferably 0% or more and 10% or less.

When the haze value in the transparent state is within the above range, the haze value is preferable in terms of excellent transparency.

The haze value in the scattering state in the liquid crystal element of the disclosure is preferably 50% or more, more preferably 60% or more, even more preferably 80% or more, and particularly preferably 90% or more. The upper limit is not particularly limited and may be 100%. Specifically, the haze value in the scattering state in the liquid crystal element of the disclosure is preferably 50% or more and 100% or less, more preferably 60% or more and 100% or less, even more preferably 80% or more and 100% or less, and particularly preferably 90% or more and 100% or less.

When the haze value in the scattering state is within the above range, the haze value is preferable in terms of excellent visual field blocking properties.

The haze difference (dynamic range) between the scattering state and the transparent state in the liquid crystal element of the disclosure, which is expressed as [haze value in scattering state]−[haze value in transparent state], is preferably 40% or more, more preferably 60% or more, even more preferably 80% or more, and particularly preferably 85% or more. The upper limit is not particularly limited, but is usually 98% or less. Specifically, the haze difference (dynamic range) between the scattering state and the transparent state in the liquid crystal element of the disclosure is preferably 40% or more and 98% or less, more preferably 60% or more and 98% or less, even more preferably 80% or more and 98% or less, and particularly preferably 85% or more and 98% or less.

When the haze difference between the scattering state and the transparent state is within the above range, the haze difference is preferable in terms of excellent light control function and being able to be suitably used as a light control shutter.

In the liquid crystal element of the disclosure, the change range between the haze value in the scattering state after 100 hours of heat treatment at 110° C. and the haze value in the scattering state before heat treatment, which is expressed as [haze value in the scattering state after heat treatment]−[haze value in the scattering state before heat treatment], is preferably 0% or more and 10% or less, more preferably 0% or more and 8% or less, even more preferably 0% or more and 5% or less, and particularly preferably 0% or more and 3% or less.

When the liquid crystal composition does not include the dichroic dye described below, the total light transmittance in the transparent state in the liquid crystal element of the disclosure is preferably 50% or more and 100% or less, more preferably 60% or more and 100% or less, even more preferably 80% or more and 100% or less, and particularly preferably 90% or more and 100% or less.

When the total light transmittance in the transparent state when a dichroic dye is not included is within the above range, the total light transmittance is preferable in terms of transparency and brightness.

In addition, when the liquid crystal composition includes the dichroic dye described below, the total light transmittance in the transparent state in the liquid crystal element of the disclosure is preferably 15% or more and 70% or less, more preferably 20% or more and 65% or less, even more preferably 30% or more and 60% or less, and particularly preferably 35% or more and 55% or less.

When the total light transmittance in the transparent state when the dichroic dye is included is within the above range, the total light transmittance is preferable in terms of transparency and brightness.

When the liquid crystal composition does not include a dichroic dye described below, the total light transmittance in the scattering state in the liquid crystal element of the disclosure is preferably 50% or more and 100% or less, more preferably 60% or more and 100% or less, even more preferably 80% or more and 100% or less, and particularly preferably 90% or more and 100% or less.

When the total light transmittance in the scattering state when the dichroic dye is not included is within the above range, the total light transmittance is preferable in terms of shielding properties and brightness.

In addition, when the liquid crystal composition includes a dichroic dye described below, the total light transmittance in the scattering state in the liquid crystal element of the disclosure is preferably 0% or more and 20% or less, more preferably 0% or more and 15% or less, even more preferably 0% or more and 10% or less, and particularly preferably 0% or more and 5% or less.

When the total light transmittance in the scattering state when the dichroic dye is included is within the above range, the total light transmittance is preferable in terms of shielding properties and darkness.

The total light transmittance difference between the scattering state and the transparent state in the liquid crystal element of the disclosure, which is expressed as [total light transmittance of scattering state value]-[total light transmittance difference of transparent state], is preferably 0% or more and 10% or less, more preferably 0% or more and 8% or less, even more preferably 0% or more and 5% or less, and particularly preferably 0% or more and 3% or less.

In the liquid crystal element of the disclosure, in the scattering state, the change range between the total light transmittance value after heat treatment at 110° C. for 100 hours and the total light transmittance value before heat treatment, which is expressed as [total light transmittance after heat treatment]−[total light transmittance before heat treatment], is preferably 0% or more and 10% or less, more preferably 0% or more and 8% or less, even more preferably 0% or more and 5% or less, and particularly preferably 0% or more and 3% or less.

<<Liquid Crystal-Polymer Composite Film>>

The liquid crystal-polymer composite film included in the liquid crystal element of the disclosure (hereinafter, may be referred to as the "liquid crystal-polymer composite film of the disclosure") contains an acetylene alcohol. Acetylene alcohol signifies a compound having a carbon-carbon triple bond and a hydroxyl group in one molecule.

<Acetylene Alcohol>

As long as the acetylene alcohol included in the liquid crystal-polymer composite film of the disclosure is uniformly dispersed in water, which serves as a dispersion medium, the acetylene alcohol may have an asymmetric or symmetric structure, and may be a structure having only one hydroxyl group, or a compound having two or more hydroxyl groups. Among the above, compounds having a plurality of hydrophilic groups and a plurality of hydrophobic groups are preferable; compounds having a Gemini-type structure having a plurality of hydrophilic groups and a plurality of hydrophobic groups via carbon-carbon triple bonds in one molecule are more preferable; and it is even more preferable that the Gemini structure is a target structure.

Examples of the acetylene alcohol having the asymmetric structure include the structure of Formula 1.

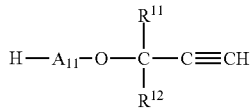

Formula 1

(In Formula 1, $R^{11}$ and $R^{12}$ each independently represent a hydrocarbon group having a linear or branched structure and 1 or more and 8 or less carbon atoms, and $A_{11}$ represents a single bond, an oxyalkylene group having 1 repeating unit, or a polyoxyalkylene group having 2 or more and 30 or less repeating units.)

Examples of a compound having two or more hydroxyl groups include acetylene glycol, which is represented by the structure of Formula 2.

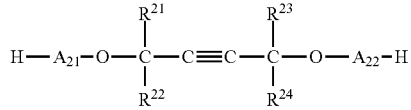

Formula 2

(In Formula 2, $R^{21}$, $R^{22}$, $R^{23}$, and $R^{24}$ each independently represent a hydrocarbon group having a linear or branched structure and 1 or more and 8 or less carbon atoms, and $A_{21}$ and $A_{22}$ each independently represent a single bond, an oxyalkylene group having 1 repeating unit, or a polyoxyalkylene group having 2 or more and 30 or less repeating units.)

Among the above, the acetylene glycol has a so-called Gemini-type structure, which has a plurality of hydrophilic groups and a plurality of hydrophobic groups via acetylene groups in one molecule, and thus has a high alignment property in liquid crystal compositions and obtains an excellent stabilizing effect, which is preferable.

In Formula 1 and Formula 2, $R^1$, $R^{12}$, $R^{21}$, $R^{22}$, $R^{23}$, and $R^{24}$ each independently represent a hydrocarbon group having a linear or branched structure and 1 or more and 8 or less carbon atoms; a hydrocarbon group having a linear or branched structure and 1 or more and 6 or less carbon atom is preferable; and it is more preferable that $R^1$, $R^{21}$, and $R^{23}$ are each independently a hydrocarbon group having a linear or branched structure and 1 or more and 3 or less carbon atoms and $R^{12}$, $R^{22}$, and $R^{24}$ are each independently a hydrocarbon group having a linear or branched structure and 4 or more and 6 or less carbon atoms.

In addition, in Formula 1 and Formula 2, from the viewpoint of stabilizing the liquid crystal composition, the acetylene group and the hydroxyl group are preferably bonded to the same carbon atom, and $A_{11}$, $A_{21}$, and $A_{22}$ are preferably single bonds.

Meanwhile, from the viewpoint of improving dispersibility in water, which is the dispersion medium, $A_{11}$, $A_{21}$, and $A_{22}$ are preferably polyoxyalkylene groups. When $A_{11}$, $A_{21}$, and $A_{22}$ are polyoxyalkylene groups, the number of repeating units of $A_{11}$, $A_{21}$, and $A_{22}$ is preferably 2 or more and more preferably 4 or more. The upper limit is preferably 24 or less, more preferably 12 or less, and even more preferably 8 or less. Specifically, when $A_{11}$, $A_{21}$, and $A_{22}$ are polyoxyalkylene groups, the number of repeating units of $A_{11}$, $A_{21}$, and $A_{22}$ is preferably 2 or more and 24 or less, more preferably 4 or more and 12 or less, and even more preferably 4 or more and 8 or less. The number of repeating units refers to n when an oxyalkylene group or polyoxyalkylene group is represented by —(OA)$_n$-, where (OA) represents an oxyalkylene unit.

The oxyalkylene groups of $A_{11}$, $A_{21}$, and $A_{22}$ preferably have 1 or more carbon atoms and more preferably have 2 or more carbon atoms. The upper limit of the number of carbon atoms is preferably 12 or less, more preferably 8 or less, and even more preferably 4 or less. The alkylene groups may be linear or branched. Specifically, the oxyalkylene groups of $A_{11}$, $A_{21}$, and $A_{22}$ preferably have 1 or more and 12 or less carbon atoms, more preferably have 2 or more and 8 or less carbon atoms, and even more preferably have 2 or more and 4 or less carbon atoms.

In addition, when the number of repeating units of $A_{11}$, $A_{21}$, and $A_{22}$ is 2 or more, a plurality of $A_{11}$, $A_{21}$, and $A_{22}$ may be the same or different. When the number of repeating units of $A_{21}$ and $A_{22}$ is 1, $A_{21}$ and $A_{22}$ may be the same or different.

Examples of acetylene alcohols include 1-pentyn-3-ol, 2-butyn-1,4 diol, 4,6-nonadecadiyn-1-ol, 2,5,8,11-tetramethyl-6-dodecyne-5,8-diol, 5,8-dimethyl-6-dodecyne-5,8-diol, 2,4,7,9-tetramethyl-5-dodecyne-4,7-diol, 8-hexadecyne-7,10-diol, 7-tetradecyne-6,9-diol, 2,3,6,7-tetramethyl-4-octyne-3,6-diol, 3,6-diethyl-4-octyne-3,6-diol, 2,5-dimethyl-3-hexyne-2,5-diol, and the like, as well as alkylene oxide derivatives of the above acetylene alcohols, and the like.

One type of acetylene alcohol may be used alone, or two or more types may be mixed and used. From the viewpoint of stability of the liquid crystal composition, a mixture of monohydric alcohol and dihydric alcohol for the acetylene alcohol is also preferable.

The acetylene alcohol included in the liquid crystal-polymer composite film of the disclosure preferably has an HLB value (that is, hydrophile-lipophile balance) of 5 or more and 15 or less. When the HLB value is 5 or more and 15 or less, the liquid crystal composition in the emulsion composition has excellent dispersibility, a liquid crystal element having a large haze in the scattering state and excellent visual field blocking properties tends to be easily obtained, the liquid crystal compound in the liquid crystal-polymer composite film is stabilized, and a liquid crystal element having excellent heat resistance is obtained, thus that HLB value is preferable. From this viewpoint, the HLB value is more preferably 6 or more and 14 or less and even more preferably 7 or more and 13 or less.

The liquid crystal-polymer composite film of the disclosure may include a surfactant other than the acetylene alcohol (hereinafter, also referred to as "other surfactants").

In the disclosure, surfactants formed of only acetylene alcohol, as well as mixtures of acetylene alcohol and a surfactant other than acetylene alcohol, are also collectively referred to as "acetylene-based surfactants".

Examples of the other surfactants include the following or the like.

Anionic surfactants such as carboxylates, sulfonates, sulfates, and phosphates;
Cationic surfactants such as amine salts and quaternary ammonium salts;
Amphoteric surfactants such as alkylamino fatty acid salts, alkylamine oxides, betaines, sulfobetaines, amidosulfobetaines, carbobetaines, and imidazolines;
Non-ionic surfactants such as ether types such as polyoxyethylene alkyl ethers, polyoxyethylene alkylaryl ethers, polyoxyethylene aralkyl ethers, polyoxyethylene aralkyl aryl ethers, polyoxyethylene polyoxypropylene block adducts, alkyl glucosides, and polyether-modified silicones; ester types such as glycerin fatty acid esters, sorbitan fatty acid esters, and sucrose fatty acid esters; ester/ether types such as polyoxyethylene fatty acid esters, polyoxyethylene sorbitan fatty acid esters, and polyoxyethylene sucrose fatty acid esters; acetyl types such as acetyl-modified polyvinyl alcohol; and fatty acid alkanolamides.

Among the above, anionic surfactants are preferable in terms of high water solubility and dispersion stability, and sulfonates are particularly preferable.

In addition, non-ionic surfactants tend to make it possible to achieve an increase in the electrical reliability of the liquid crystal element, thus the non-ionic surfactants are preferable. Among the above, ether or ester types are preferable and polyoxyethylene alkyl ethers, polyoxyethylene alkylaryl ethers, polyoxyethylene aralkyl ethers, polyoxyethylene aralkyl aryl ethers, polyoxyethylene polyoxypropylene block adducts, and the like are particularly preferable.

When other surfactants are included, the contained amount thereof is not particularly limited, but the contained amount of the other surfactants is preferably 20% to 80% by mass and more preferably 20% to 75% by mass with respect to 100% by mass of the mixture of the acetylene alcohol and the surfactant. When the contained amount is the lower limit value or more, it is possible to increase the affinity of the acetylene alcohol to water to improve dispersibility, and when the contained amount is the upper limit or less, the heat resistance tends to be excellent.

In addition, when the other surfactants are included, the contained amount of the other surfactants is preferably 0.1% by mass or more and more preferably 0.5% by mass or more with respect to the liquid crystal composition. In addition, the contained amount is preferably 20% by mass or less and more and preferably 10% by mass or less. By setting the added amount of the surfactant within the above range, the dispersion of the emulsion is stabilized and the particle size of the liquid crystal composition tends to be controllable within a desired range. Specifically, when the other surfactants are included, the contained amount of the other surfactants is preferably 0.1% by mass or more and 20% by mass or less and more preferably 0.5% by mass or more and 10% by mass or less with respect to the liquid crystal composition.

Furthermore, when the other surfactants are included, the mass ratio expressed by [contained amount of acetylene alcohol]/[contained amount of other surfactants] is preferably 20 to 0.5, more preferably 10 to 0.8, and even more preferably 5 to 1.

The contained amount of the acetylene alcohol is preferably 20% to 100% by mass and more preferably 20% to 100% by mass with respect to 100% by mass of the acetylene-based surfactant. When the contained amount is the lower limit value or more, it is possible to increase the affinity of the acetylene alcohol to water to improve dispersibility, and when the contained amount is the upper limit or less, the heat resistance tends to be excellent.

In the liquid crystal-polymer composite film, the contained amount of acetylene alcohol is preferably 1% by mass or more and 5% by mass or less and more preferably 2% by mass or more and 4% by mass or less with respect to 100% by mass of the liquid crystal-polymer composite film. By setting the contained amount of acetylene alcohol within the above range, the stability of the liquid crystal-polymer composite film is improved and the stability during high-temperature storage tends to be favorable.

In the liquid crystal-polymer composite film, the contained amount of acetylene-based surfactant is preferably 1% by mass or more and 10% by mass or less, more preferably 2% by mass or more and 10% by mass or less, and even more preferably 4% by mass or more and 8% by mass or less with respect to 100% by mass of the liquid crystal-polymer composite film. By setting the contained amount of acetylene-based surfactant within the above range, the stability of the liquid crystal-polymer composite film is improved and the stability during high-temperature storage tends to be favorable. The total of the contained amount of acetylene alcohol and the contained amount of the other surfactants does not exceed 100% by mass with respect to the mass of the acetylene-based surfactant.

In addition, for the same reasons as above, the HLB value of a mixture of the acetylene alcohol and a surfactant other than the acetylene alcohol is preferably 5 or more and 15 or less, more preferably 6 or more and 14 or less, and even more preferably 7 or more and 13 or less.

It is possible to calculate the HLB value of a mixture of two or more components as a weighted average value of the HLB values and weight ratios of the components formulating the mixture.

In the present embodiment, an acetylene alcohol having an HLB value of more than 15 or an acetylene alcohol having an HLB value of less than 5 may be mixed with other acetylene alcohols or a surfactant other than the acetylene alcohol to set the HLB value of the mixture to 5 or more and 15 or less.

When the acetylene-based surfactant is a known or commercially available product, the HLB value may be a literature value or a catalog value. When the literature value or the catalog value is unknown, it is possible to obtain the value by calculation.

A plurality of methods for calculating the HLB value are known, but in the present specification, the value is obtained using the Griffin formula described below:

HLB value=20×[(molecular weight of hydrophilic group included in surfactant)/(molecular weight of surfactant)]

In the formula, the "molecular weight of hydrophilic group" signifies a partial structure that exhibits hydrophilicity in an acetylene alcohol compound. Specifically, for example, the hydrophilic part in the compound represented by Formula 2 is a hydroxyl group (that is, two "—OH") when $A_{21}$ and $A_{22}$ are single bonds, and the hydrophilic part is an oxyalkylene group, a polyoxyalkylene group, and a hydroxyl group when $A_{21}$ and $A_{22}$ are oxyalkylene groups or polyoxyalkylene groups.

The liquid crystal-polymer composite film of the disclosure contains a polymer matrix (hereinafter, may be referred to as the "polymer matrix of the disclosure") and a liquid crystal composition (hereinafter, may be referred to as the "liquid crystal composition of the disclosure") and the liquid crystal composition is preferably present in the polymer matrix. The liquid crystal composition is more preferably dispersed in the polymer matrix.

When the liquid crystal-polymer composite film of the disclosure contains a polymer matrix and a liquid crystal composition and the liquid crystal composition is present in the polymer matrix, the liquid crystal element exhibits flexibility. In addition, by having such a structure, leakage of the liquid crystal composition is minimized even when the liquid crystal element is cut, and in addition, the polymer matrix protects the liquid crystal composition from factors causing deterioration, such as oxygen and moisture, making cutting and molding possible.

<Liquid Crystal Composition>

The liquid crystal composition of the disclosure may be irregularly dispersed or may be regularly arranged in the polymer matrix.

In the liquid crystal-polymer composite film of the disclosure, the shape of the liquid crystal composition of the disclosure may be any of a sphere, a spheroid, a cylinder, or polygonal prisms such as a triangular prism, a rectangular prism, and a hexagonal prism, and these shapes may be distorted. Among the above, a sphere, a spheroid, and a cylinder tend to weaken the light scattering of the liquid crystal-polymer composite film, increase the light absorption of the dichroic dye in a colored state, and reduce the haze in the transparent state, thus a sphere, a spheroid, and a cylinder are preferable.

From the viewpoint of transparency of the obtained liquid crystal element, for the size of the liquid crystal composition in the liquid crystal-polymer composite film of the disclosure, when observed from the film surface of the liquid crystal-polymer composite film, an average particle size of 2 μm or more is preferable and an average particle size of 5 μm or more is more preferable. In addition, the average particle size is preferably 50 μm or less and more preferably 30 μm or less. By setting the average particle size to be the lower limit value or more, the light scattering of the liquid crystal-polymer composite film tends to be weak and the haze in the transparent state tends to be small. By setting the average particle size to be the upper limit value or less, the graininess of the liquid crystal composition tends to disappear and the uniformity of the appearance of the liquid crystal element tends to be favorable. Specifically, in the liquid crystal-polymer composite film, from the viewpoint of transparency of the obtained liquid crystal element, for the size of the liquid crystal composition, when observed from the film surface of the liquid crystal-polymer composite film, an average particle size of 2 μm or more and 50 μm or less is preferable and an average particle size of 5 μm or more and 30 μm or less is more preferable.

From the viewpoint of the light scattering properties of the obtained liquid crystal element, for the size of the liquid crystal composition, when observed from the film surface of the liquid crystal-polymer composite film, an average particle size of 0.01 μm or more is preferable and an average particle size of 0.1 μm or more is more preferable. In addition, the average particle size is preferably 2 μm or less and more preferably 1 μm or less. By setting the average particle size to be less than the above upper limit value, the light scattering of the liquid crystal-polymer composite film tends to be strong, the haze in the scattering state tends to be large, and the dynamic range (haze difference between the scattering state and the transparent state) tends to be large. By setting the average particle size of the liquid crystal composition to be the above lower limit value or more, it is easy to prevent the average particle size from becoming excessively small (much smaller than the visible light wavelength) and reducing the effect thereof. Specifically, from the viewpoint of the light scattering properties of the obtained liquid crystal element, for the size of the liquid crystal composition in the liquid crystal-polymer composite film, when observed from the film surface of the liquid crystal-polymer composite film, an average particle size of 0.01 μm or more and less than 2 μm is preferable and an average particle size of 0.1 μm or more and 1 μm or less is more preferable.

The average particle size of the liquid crystal composition described above is the median diameter based on the number of particles.

When observed from the film surface of the liquid crystal-polymer composite film, when the shape of the liquid crystal composition is not a circle but a polygon such as an ellipse, triangle, square, or hexagon, or these shapes are distorted, the particle size may be determined by referring to the diameter of the minimum enclosing circle. For the observation, when the particle size is 1 μm or more, direct observation from the liquid crystal-polymer composite film surface with an optical microscope is possible, and when the particle size is 1 μm or less, it is possible to carry out the observation and measurement using a scanning electron microscope (SEM) by cutting out a cross-section of the liquid crystal-polymer composite film, washing off the liquid crystal with acetone or the like, and then carrying out a conductivity-imparting treatment by sputtering Au or the like.

(Liquid Crystal Component)

The liquid crystal composition of the disclosure preferably contains a liquid crystal component (hereinafter, may be referred to as the "liquid crystal component of the disclosure") and the dielectric anisotropy (Δε) of the liquid crystal component of the disclosure is preferably positive. In this case, the liquid crystal composition is in a normal mode in which the liquid crystal composition is in a scattering state when no voltage is applied and in transparent state when a voltage is applied. It is possible to determine the dielectric anisotropy (Δε) by filling the liquid crystal between substrates subjected to an alignment treatment in the horizontal or vertical direction, measuring the capacitance with an LCR meter to calculate the dielectric constant (ε//) of the liquid crystal component subjected to an alignment treatment in the horizontal direction and the dielectric constant (ε⊥) of the liquid crystal component subjected to an alignment treatment in the vertical direction, and using the difference (ε//−ε⊥) therebetween.

The NI point (nematic phase-isotropic phase transition temperature) of the liquid crystal component of the disclosure is preferably 110° C. or higher and 150° C. or lower, more preferably 115° C. or higher and 145° C. or lower, and even more preferably 120° C. or higher and 140° C. or lower. When the NI point is the above lower limit or more, it tends to be possible to maintain the dynamic range of the transmittance change and/or the dynamic range of the haze difference between the scattering state and the transparent state even when continuously driven at a high temperature of approximately 90° C. In addition, the higher the NI point, the wider the dynamic range of the transmittance change and/or the dynamic range of the haze difference between the scattering state and the transparent state tends to be. Meanwhile, as the NI point increases, the lower limit of the temperature of the nematic phase also tends to increase, thus, from the viewpoint of operation at low temperatures, the NI point is preferably the above upper limit or less.

The method for measuring the NI point of the liquid crystal component is not particularly limited, but measurements may be obtained by first solubilizing the liquid crystal composition and observing a phase transition or a phase separation caused by a temperature increase using a polarizing microscope.

The refractive index anisotropy (Δn) of the liquid crystal component of the disclosure is preferably 0.01 or more, more preferably 0.02 or more, and even more preferably 0.03 or more. In addition, the refractive index anisotropy (Δn) is preferably 0.11 or less and more preferably 0.10 or less. By setting Δn to be the above upper limit value or less, light scattering at the interface between the polymer matrix and the liquid crystal composition is reduced and it tends to be possible to reduce the haze in the transparent state. Meanwhile, by setting Δn to be the above lower limit value or more, the order parameter of the liquid crystal composition tends to be larger. Specifically, the refractive index anisotropy (Δn) of the liquid crystal component of the disclosure is preferably 0.01 or more and 0.11 or less, more preferably 0.02 or more and 0.11 or less, and even more preferably 0.03 or more and 0.10 or less.

It is possible to obtain the refractive index anisotropy of the liquid crystal component by directly determining the ordinary light refractive index (no) and extraordinary light refractive index (ne) of the liquid crystal component, and using the difference (Δn=ne−no) therebetween. When it is difficult to carry out direct determination, it is also possible to carry out the determination by determining the phase difference (retardation: R) when passing through a sample having a thickness d and dividing the result by the thickness d (R=Δnd). It is possible to measure the ordinary light refractive index (no) and extraordinary light refractive index (ne) by the Abbe method.

As the liquid crystal included in the liquid crystal component, it is possible to use a nematic liquid crystal, a cholesteric liquid crystal, a smectic liquid crystal, and the like. A nematic liquid crystal may be converted into a cholesteric liquid crystal (chiral nematic liquid crystal) by adding a chiral agent and a nematic liquid crystal or a chiral nematic liquid crystal is preferable in consideration of being usable at low cost.

When using known liquid crystalline substances as liquid crystal components, specifically, it is possible to use various low molecular weight compounds or mixtures thereof, such as biphenyls, phenylcyclohexanes, and cyclohexylcyclohexanes, as described in "Liquid Crystal Device Handbook", edited by the 142nd Committee of the Japan Society for the Promotion of Science, Nihon Kogyo Shimbunsha (1989), pp. 152-192, and "Handbook of Liquid Crystals", edited by the Liquid Crystal Handbook Editorial Committee, Maruzen Co., Ltd., (2000), pp. 260-330. In addition, it is also possible to use polymer-based compounds or mixtures thereof, as described in "Handbook of Liquid Crystals", edited by the Liquid Crystal Handbook Editorial Committee, Maruzen Co., Ltd., (2000), pp. 365-415. Examples of compounds forming nematic liquid crystals include the following compounds or the like.

[Chem. 3]

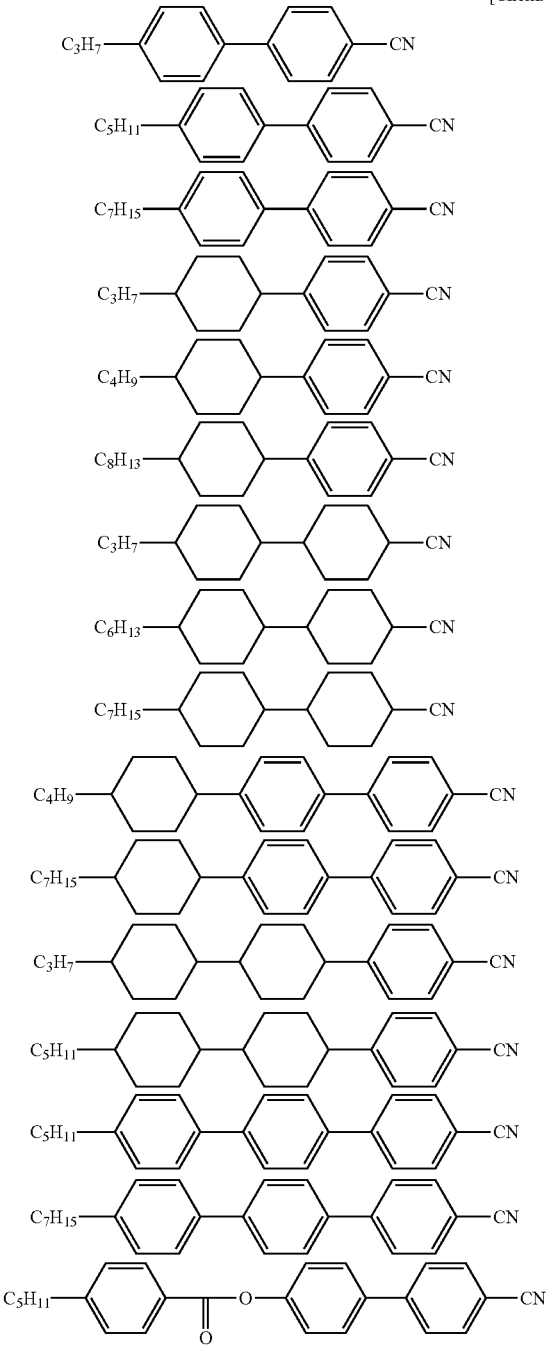

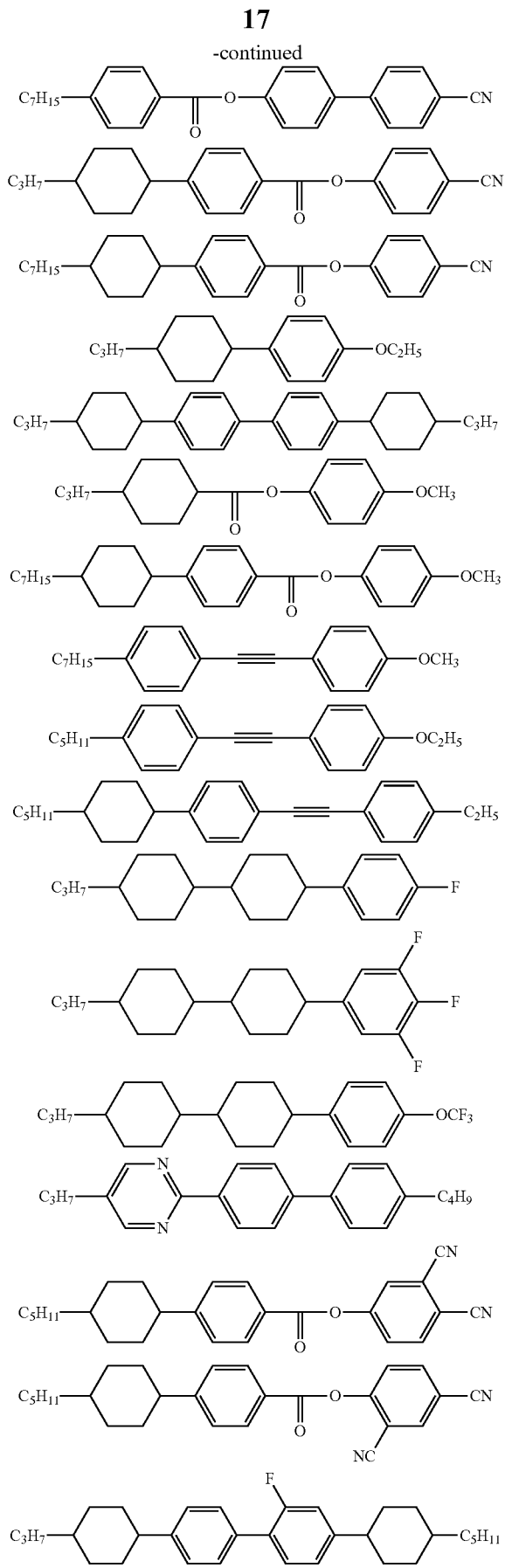

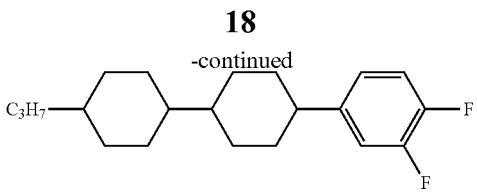

As cholesteric liquid crystals (chiral nematic liquid crystals), for example, it is possible to use the above-described nematic liquid crystal mixed with a chiral agent to have optical rotation.

As the nematic liquid crystal and the cholesteric liquid crystal (chiral nematic liquid crystal), crystals with low viscosity and high dielectric anisotropy are preferable in terms of high-speed responsiveness of the liquid crystal element and manufacturability of the emulsion.

The contained amount of the liquid crystal component is preferably 80% by mass or more and 99% by mass or less and more preferably 90% by mass or more and 98.5% by mass or less with respect to the mass of the liquid crystal composition. By setting the contained amount of the liquid crystal component to be within the above range, the responsiveness to the applied voltage tends to be favorable.

The contained amount of the liquid crystal component is preferably 25% by mass or more and 60% by mass or less and more preferably 40% by mass or more and 55% by mass or less with respect to the mass of the liquid crystal-polymer composite film. By setting the contained amount of the liquid crystal component to be within the above range, the liquid crystal tends to be stably held in the polymer composite film.

(Dichroic Dye)

The liquid crystal composition of the disclosure may contain a dichroic dye in addition to the liquid crystal component. Such a liquid crystal composition is generally known as a guest-host liquid crystal.

The dichroic dye may be any dichroic dye compound that is soluble with the liquid crystal component and may be a dichroic dye with positive or negative $\Delta\varepsilon$. In addition, the dichroic dye may also exhibit liquid crystallinity by itself.

Specific examples of dichroic dyes include azo-based dyes, anthraquinone-based dyes, naphthoquinone-based dyes, perylene-based dyes, quinophthalone-based dyes, tetrazine-based dyes, benzothiadiazole-based dyes, and the like. When using a known dichroic dye, it is possible to use an azo-based dye, an anthraquinone-based dye, or a mixture thereof, as described in "Liquid Crystal Device Handbook," edited by the 142nd Committee of the Japan Society for the Promotion of Science, Nihon Kogyo Shimbunsha (1989), pp. 192-196 and pp. 724-730. Among the above, it is preferable to include at least one selected from the group consisting of anthraquinone-based dyes and azo-based dyes, as these dyes tend to have a large absorption coefficient, a high solubility in the liquid crystal component, and high light resistance. Here, an anthraquinone-based dye is a compound having an anthraquinone skeleton in the molecule. An azo-based dye is a compound having an azo group (—N=N—) in the molecule.

The dichroic dye may be one type, or a plurality of types may be mixed and used. Although there is no particular limitation, when the liquid crystal composition contains a dichroic dye, the liquid crystal composition preferably includes at least one of the dichroic dyes selected from the group consisting of anthraquinone-based dyes and azo-based dyes in a total amount of 20% by mass and more preferably includes at least one of the dichroic dyes in a total amount of 50% by mass with respect to the total mass of the dichroic dyes. Specifically, when the liquid crystal composition contains a dichroic dye, the total contained amount of the anthraquinone-based dye and the azo-based dye is preferably 20% by mass or more and 100% by mass or less with respect to the total mass of the dichroic dyes and more preferably 50% by mass or more and 100% by mass or less with respect to the total mass of the dichroic dyes.

Specific examples of the dichroic dye include compounds represented by the following formula or the like.

[Chem. 4]

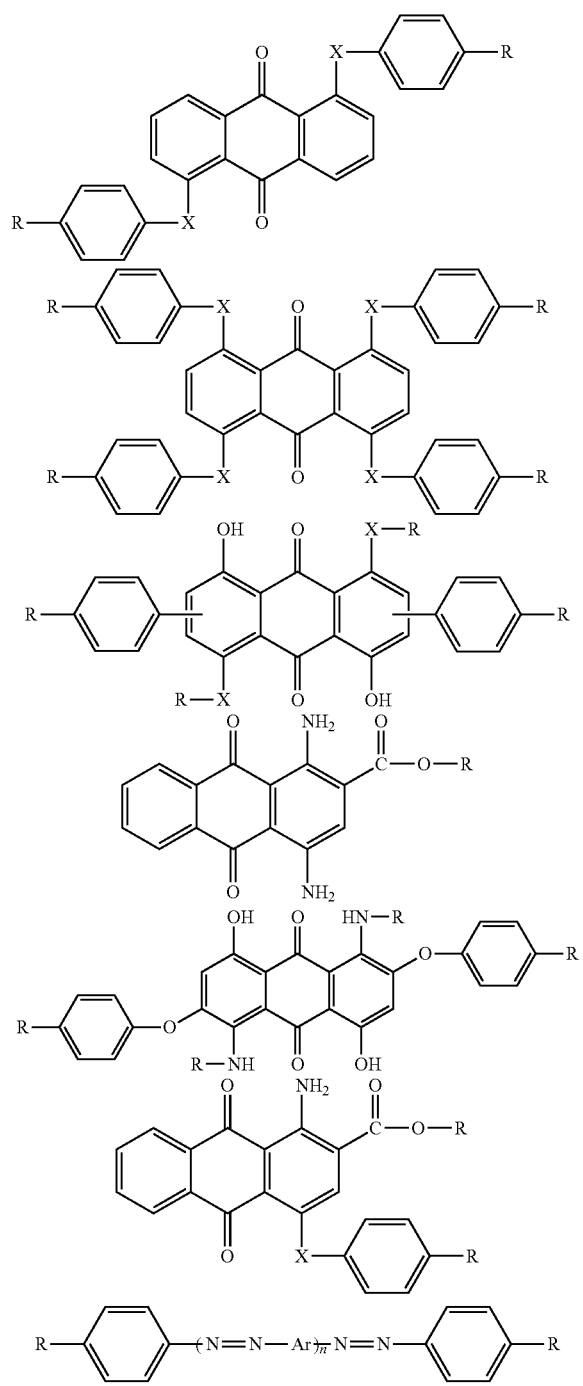

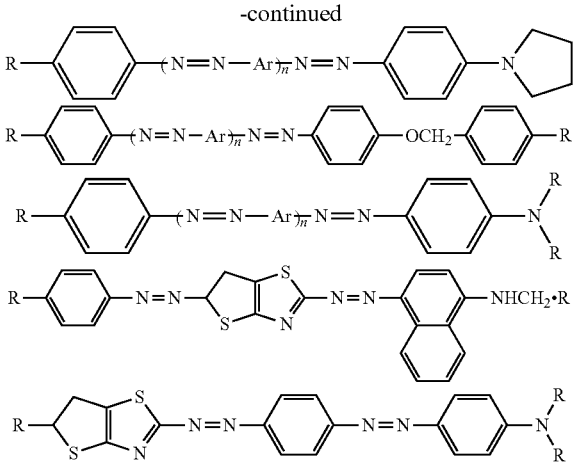

In the above formula, X each independently represents —NH— or —S—, n represents 0 or 1, and Ar represents a substituted or unsubstituted phenylene group or a substituted or unsubstituted naphthylene group.

R each independently represents a hydrogen atom, a substituted or unsubstituted alkyl group, a substituted or unsubstituted alkoxy group, a substituted or unsubstituted cycloalkyl group, a substituted or unsubstituted phenyl group, a substituted or unsubstituted phenylcycloalkyl group, or a substituted or unsubstituted bicycloalkyl group.

As the alkyl group, a linear or branched chain alkyl group having 1 to 20 carbon atoms is preferable and a linear or branched chain alkyl group having 1 to 10 carbon atoms is more preferable.

As the alkoxy group, a linear or branched chain alkoxy group having 1 to 20 carbon atoms is preferable and a linear or branched chain alkoxy group having 1 to 10 carbon atoms is more preferable.

As the cycloalkyl group, a cycloalkyl group having 3 to 20 carbon atoms is preferable, a cycloalkyl group having 3 to 10 carbon atoms is more preferable, and a cyclohexyl group is even more preferable.

As the phenylcycloalkyl group, a group in which a phenyl group is bonded to a cycloalkyl group having 3 to 20 carbon atoms is preferable, a group in which a phenyl is bonded to a cycloalkyl group having 3 to 10 carbon atoms is more preferable, and a phenylcyclohexyl group is even more preferable.

As the bicycloalkyl group, a group in which a cycloalkyl group having 3 to 20 carbon atoms is bonded to a cycloalkyl group having 3 to 20 carbon atoms (that is, a bicycloalkyl group having 6 to 40 carbon atoms) is preferable, a group in which a cycloalkyl group having 3 to 10 carbon atoms is bonded to a cycloalkyl group having 3 to 10 carbon atoms (that is, a bicycloalkyl group having 6 to 20 carbon atoms) is more preferable, and a bicyclohexyl group (cyclohexylhexyl group) is even more preferable.

Examples of the substituent include an alkyl group having 1 to 5 carbon atoms, an alkoxy group having 1 to 5 carbon atoms, a halogen atom, and the like.

When the liquid crystal composition contains a dichroic dye, the contained amount of the dichroic dye with respect to 100% by mass of the liquid crystal composition is not particularly limited, but is preferably 0.1% by mass or more, more preferably 1% by mass or more, and even more preferably 3% by mass or more. In addition, the contained amount of the dichroic dye with respect to 100% by mass of the liquid crystal composition is preferably 20% by mass or less, more preferably 15% by mass or less, and even more preferably 10% by mass or less.

By setting the contained amount of the dichroic dye to be the above lower limit value or more, the obtained liquid crystal element tends to exhibit greater light absorption in the colored state and to have a smaller amount of transmitted light. By setting the contained amount of the dichroic dye to be the above upper limit value or less, separation or precipitation of the dichroic dye tends to be less likely to occur and the reliability of the liquid crystal element tends to be improved.

It is possible to combine the above upper limit and lower limit in any manner. For example, when the liquid crystal composition contains a dichroic dye, the contained amount of the dichroic dye with respect to 100% by mass of the liquid crystal composition is preferably 0.1% by mass or more and 20% by mass or less, more preferably 1% by mass or more and 15% by mass or less, even more preferably 2% by mass or more and 12% by mass or less, and particularly preferably 3% by mass or more and 10% by mass or less.

When the liquid crystal composition contains a dichroic dye, the contained amount of the dichroic dye is preferably 0.2% by mass or more and 10% by mass or less and more preferably 1.5% by mass or more and 6% by mass or less with respect to the mass of the liquid crystal-polymer composite film. By setting the contained amount of the dichroic dye to be within the above range, a high contrast tends to be achievable.

The liquid crystal composition may contain additives other than the liquid crystal component and the dichroic dye in a range in which the performance of the liquid crystal element of the disclosure is not impaired. Specifically, the liquid crystal composition may have a polymer precursor, a polymerization initiator, a light stabilizer, an antioxidant, a thickener, a polymerization inhibitor, a photosensitizer, an adhesive, a defoaming agent, a chiral agent, and the like.

The chiral agent may be any chiral compound that is soluble with the liquid crystal component and may be a synthetic product or a commercially available product. In addition, the chiral agent may exhibit liquid crystallinity by itself or may have a polymerizable functional group. Furthermore, the chiral agent may be dextrorotatory or levorotatory, and a dextrorotatory chiral agent and a levorotatory chiral agent may be used in combination.

In addition, the chiral agent preferably has a large positive dielectric anisotropy and a low viscosity by itself from the viewpoint of driving voltage reduction and the response speed of the liquid crystal element, and a larger Helical Twisting Power, which is an index of the force with which the chiral agent twists the liquid crystal, is more preferable.

Examples of commercially available chiral agents include (R)-4-cyano-4'(2-methyl)butylbiphenyl (product name: CB-15, manufactured by Merck), (S)-4-cyano-4'(2-methyl) butoxybiphenyl product name: C15, manufactured by Merck), (S)-4-[1-methylheptyloxy]carbonylphenyl-4-(hexyloxy)benzoate (product name: S-811, manufactured by Merck), (R)-4-[1-methylheptyloxy]carbonylphenyl-4-(hexyloxy)benzoate (product name: R-811, manufactured by Merck), bis[4-(4-pentylcyclohexyl)benzoic acid](S)-1-phenylethylene (product name: S-1011, manufactured by Merck), bis[4-(4-pentylcyclohexyl)benzoic acid](R)-1-phenylethylene (product name: R-1011, manufactured by Merck), and the like.

When the liquid crystal composition of the disclosure contains a chiral agent, the contained amount thereof is not particularly limited, but the reciprocal (1/p) of the chiral pitch p [μm], which is determined by the ratio of the amount of the liquid crystal component and the chiral agent used, is preferably 0.01 to 0.5 [/μm] and more preferably 0.01 to 0.3 [/μm]. When the reciprocal (1/p) of the chiral pitch is the above lower limit value or more, it is possible to improve the light scattering property in the scattering state, and when the reciprocal (1/p) is the above upper limit value or less, it is possible to suppress rises in the voltage. It is possible to measure the chiral pitch by the Cano wedge method.

When the liquid crystal composition of the disclosure contains a chiral agent, the contained amount of the chiral agent is preferably 0.1% by mass or more and 6% by mass or less and more preferably 0.2% by mass or more and 3% by mass or less with respect to the liquid crystal composition. By setting the contained amount of the chiral agent to be within the above range, the contrast tends to be increasable.

When the liquid crystal composition contains a chiral agent, the contained amount of the chiral agent is preferably 0.04% by mass or more and 4% by mass or less and more preferably 0.1% by mass or more and 2.5% by mass or less with respect to the mass of the liquid crystal-polymer composite film. By setting the contained amount of the chiral agent to be within the above range, the contrast tends to be increasable.

In the liquid crystal-polymer composite film, the contained amount of the liquid crystal composition of the disclosure is preferably 40% by mass or more and 70% by mass or less and more preferably 45% by mass or more and 60% by mass or less with respect to 100% by mass of the liquid crystal-polymer composite film. By setting the contained amount of the liquid crystal composition to be within the above range, the optical properties tend to be favorable and the liquid crystal tends to be stably present in the composite film.

In the liquid crystal composition of the disclosure, the total of the liquid crystal component and other components does not exceed 100% by mass with respect to the mass of the liquid crystal composition.

In the liquid crystal-polymer composite film of the disclosure, the total of the liquid crystal component, polymer matrix, acetylene alcohol, and other components does not exceed 100% by mass with respect to the mass of the liquid crystal-polymer composite film.

<Polymer Matrix>

As the polymer matrix of the disclosure, a hydrophilic polymer is preferably used. In this case, there are no particular limitations as long as the polymer is hydrophilic, but it is preferable to select the polymer such that the refractive index matches the ordinary light refractive index (no) of the liquid crystal component. Typically, the no of the liquid crystal component is around 1.5, thus, the refractive index of the polymer matrix at a temperature of 25° C. and a wavelength of 589 nm is preferably 1.45 or more and 1.55 or less.

The weight-average molecular weight (Mw) of the polymer forming the polymer matrix is preferably 1,000 or more, and more preferably 10,000 or more. In addition, the weight-average molecular weight (M w) is preferably 1,000,000 or less and more preferably 100,000 or less. When the weight-average molecular weight (Mw) is the above lower limit value or more, the liquid crystal composition tends to be easily held within the polymer matrix. When the weight-average molecular weight (Mw) is the above upper limit value or less, it tends to be easy to form a film. The weight-average molecular weight (Mw) signifies a value calculated by gel permeation chromatography according to a standard method. Specifically, the weight-average molecular weight (Mw) of the polymer forming the polymer matrix is preferably 1,000 or more and 1,000,000 or less and more preferably 10,000 or more and 100,000 or less.

As the polymer forming the polymer matrix, the following may be used: natural polymers such as gelatin and gum arabic; synthetic polymers such as polyvinyl alcohol, polyurethane, polyurea, polyacryl, polyamine, polyamide, polyethylene, polypropylene, polystyrene, polyacrylonitrile, and modified products thereof; copolymers such as methacrylate/acrylonitrile, urethane/acrylate, and acrylate/acrylonitrile; and the like. In addition, a cross-linking structure may be introduced into the polymer using a cross-linking agent.

The polymer is preferably highly dispersible or soluble in water, and gelatin, polyvinyl alcohol, polyurethane, polyurea, polyacryl, polyamine, and modified products thereof are preferable. At least one selected from the group consisting of polyurethane, polyacryl, polyvinyl alcohol, and modified products thereof is more preferable, at least one selected from the group consisting of polyurethane, polyacryl, and modified products thereof is even more preferable, and polyacryl is particularly preferable. These polymers may be used as one type only or in a mixture of two or more types.

Polyurethanes are classified according to the respective skeletons of polyisocyanate-derived skeletons (hereinafter, also referred to as "polyisocyanate skeletons") and polyol-derived skeletons (hereinafter, also referred to as "polyol skeletons"). Examples of polyisocyanate skeletons include aliphatic isocyanate skeletons consisting of aliphatic carbon skeletons and aromatic isocyanate skeletons containing aromatic rings. Among the above, aliphatic isocyanate skeletons are preferable due to the high light resistance thereof. Examples of polyol skeletons include skeletons derived from polyether-based polyols having a plurality of ether bonds in one molecule, skeletons derived from polyester-based polyols having a plurality of ester bonds in one molecule, and skeletons derived from polycarbonate-based polyols having a plurality of carbonate bonds in one molecule, and among the above, skeletons derived from polyether-based polyols are preferable due to the favorable film adhesion thereof.

Polyacryls are formed of polymers of various acrylate monomers. Examples of acrylic monomers include compounds represented by Formula 5 or the like.

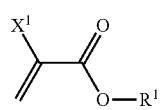

Formula 5

In Formula 5, $X^1$ represents a hydrogen atom or a methyl group, and $R^1$ represents a hydrogen atom, a substituted or unsubstituted linear or branched alkyl group having 1 or more and 20 or less carbon atoms, a substituted or unsubstituted linear or branched alkoxy group having 1 or more and 20 or less carbon atoms, or a substituted or unsubstituted cyclic hydrocarbon group having 1 or more and 10 or less carbon atoms. The substituents include a halogen atom, a hydroxy group, an alkyl group having 1 or more and 5 or less carbon atoms, an alkoxy group having 1 or more and 5 or less carbon atoms, and the like.

Polyacryls may be copolymerized with a monomer other than acrylate and examples of the copolymers include acrylate-styrene, acrylate-vinyl acetate, acrylate-acrylonitrile, acrylate-urethane, acrylate-ester, acrylate-silicone, and the like. The main chain may be formed of a copolymer of acrylate and another monomer, or another polymer may be grafted onto the polyacryl main chain.

The polymer matrix may contain a low molecular weight compound in a range in which the performance of the liquid crystal element of the disclosure is not impaired. Specific examples of the small molecule include light stabilizers, antioxidants, thickeners, polymerization inhibitors, photosensitizers, adhesives, defoaming agents, water-soluble dyes, and the like.

In the liquid crystal-polymer composite film of the disclosure, the total of the liquid crystal composition, polymer matrix, acetylene alcohol, and other components does not exceed 100% by mass with respect to the mass of the liquid crystal-polymer composite film.

In the liquid crystal-polymer composite film, the contained amount of the polymer matrix is preferably 15% by mass or more and 45% by mass or less and more preferably 25% by mass or more and 40% by mass or less with respect to 100% by mass of the liquid crystal-polymer composite film. By setting the contained amount of the polymer matrix to be within the above range, the optical properties tend to be favorable and the liquid crystal tends to be stably present in the composite film.

(Ratio of Liquid Crystal Composition to Polymer Matrix)

In the liquid crystal-polymer composite film of the disclosure, for the ratio of the total mass of the liquid crystal composition to the total mass of the polymer matrix, the liquid crystal composition is preferably 0.5 or more and more preferably 1 or more, assuming that the total mass of the polymer matrix is 1. In addition, the liquid crystal composition is preferably 4 or less and more and preferably 3 or less. By setting the ratio of the total mass of the liquid crystal composition with respect to the total mass of the polymer matrix to be the above lower limit value or more, the haze in the transparent state tends to be low and the driving voltage tends to be low. By setting the ratio of the total mass of the liquid crystal composition with respect to the total mass of the polymer matrix to be the above upper limit value or less, the impact resistance and adhesion of the liquid crystal-polymer composite film tend to be improved. Specifically, in the liquid crystal-polymer composite film of the disclosure, the mass ratio, which is the ratio of the total mass of the liquid crystal composition with respect to the total mass of the polymer matrix and expressed as [liquid crystal composition]/[polymer matrix], is preferably 0.5 or more and 4 or less, and more preferably 1 or more and 3 or less.

In addition, the liquid crystal-polymer composite film of the disclosure may contain a compound having a high dielectric constant in addition to the polymer matrix component and the acetylene-based surfactant component, for the purpose of increasing the relative dielectric constant of the liquid crystal-polymer composite film forming the liquid crystal element and reducing the driving voltage.

Examples of the compounds having a high dielectric constant include organic compounds having a polar group and inorganic particles. Examples of the organic compounds having a polar group include alcohol compounds other than acetylene alcohol, cyano compounds, carbonyl compounds, and amino compounds. In particular, the alcohol compounds tend to have high hydrophilicity, be uniformly dispersible when mixed into the emulsion composition, and be able to improve the relative dielectric constant of the liquid crystal-polymer composite film, thus the alcohol compounds are preferable. In particular, the liquid crystal-polymer composite film of the disclosure preferably contains an alcohol having 5 or less carbon atoms. By containing the compound together with the acetylene-based surfactant, it is possible to obtain a liquid crystal element having excellent driving properties at low voltage and low power consumption.

Examples of the alcohol having 5 or less carbon atoms include methanol, ethanol, propanol, isopropanol, butanol, pentanol, ethylene glycol, and glycerin.

The alcohol having 5 or less carbon atoms may also be bonded to a functional group other than a hydroxyl group. In addition, only one type of alcohol may be used, or two or more types may be mixed and used.

As the alcohol having 5 or less carbon atoms, a polyhydric alcohol having two or more hydroxyl groups is preferable. With a polyhydric alcohol, hydrogen bonds between molecules increase, the boiling point increases, and it tends to be possible to suppress volatilization of the alcohol during film formation. From the viewpoint of viscosity, the number of hydroxyl groups in the polyhydric alcohol is preferably 2 or more and 4 or less.

The added amount of the compound is not particularly limited, but is preferably 0.5 parts by mass or more and more preferably 1 part by mass or more with respect to 100 parts by mass of the liquid crystal composition. In addition, the added amount is preferably 40 parts by mass or less and more preferably 30 parts by mass or less. By setting the added amount of the compound to be within the above range, the obtained liquid crystal element tends to have excellent driving properties at low voltage.

(Substrate with Transparent Conductive Film)

Representative configurations of the substrates with a transparent conductive film according to the disclosure will be described below, without being limited thereto.

Examples of the material of the substrate include inorganic transparent materials such as glass or quartz, or colorless and transparent materials such as metals, metal oxides, semiconductors, ceramics, plastic plates, and plastic films. These substrates may be used as a single substrate or a plurality of the substrates may be layered and used.

Among the above, resin substrates using plastic plates or plastic films are preferable in terms of productivity and processability. Further, among the above, resin substrates using plastic films are flexible and therefore easy to install when used as a light control film, thus resin substrates are preferable.

The substrate may be provided with a hard coat layer to protect from scratches and dirt, or with a sharp cut layer or bandpass layer to block light in a specific wavelength range.

The transparent conductive film forming the electrode is formed by forming a thin film of, for example, a metal oxide, a metal, a semiconductor, an organic conductive material, or the like on the entire substrate or partially thereon by a known application method, printing method, deposition method such as sputtering or the like, or the like. In addition, the transparent conductive film may be partially etched after the conductive thin film is formed. In particular, to obtain a liquid crystal element having a large area, from the standpoint of productivity and processability, it is desirable to use an electrode substrate in which an ITO (mixture of indium oxide and tin oxide) electrode is formed on a transparent polymer film such as PET using a deposition method such as sputtering, a printing method, or the like.

Wiring for connecting between electrodes or between the electrodes and the outside may be provided on the substrate. For example, the substrate may be an electrode substrate for segment driving, an electrode substrate for matrix driving, an electrode substrate for active matrix driving, or the like.

Furthermore, the surface of the electrode provided on the substrate may be entirely or partially covered with a protective film or an alignment film formed of an organic compound such as polyimide, polyamide, silicone, or a cyanide compound, an inorganic compound such as $SiO_2$, $TiO_2$, or $ZrO_2$, or a mixture thereof.

The substrates may be subjected to an alignment treatment to align the liquid crystal with respect to the substrate surface, and when subjected to the alignment treatment, for example, both substrates may be homogeneously aligned or homeotropically aligned, or one substrate may be homogeneously aligned and the other substrate may be homeotropically aligned, which is a so-called hybrid. These alignment treatments may involve direct rubbing of the electrode surface, may involve the use of a normal alignment film such as polyimide used in TN liquid crystals, STN liquid crystals, or the like, or may involve performing a photoalignment treatment.

The facing substrates may have an adhesive layer including a resin body that adheres to and supports the substrates at a peripheral part as appropriate.

By sealing the end or cut surface of the liquid crystal element of the disclosure using tapes such as adhesive tape, thermocompression tape, and thermosetting tape, curable resins or thermoplastic resins such as thermosetting resins, photocurable resins, moisture-curable resins, room temperature curable adhesives, anaerobic adhesives, epoxy-based adhesives, silicone-based adhesives, fluororesin-based adhesives, polyester-based adhesives, and vinyl chloride-based adhesives, and the like, it is possible to prevent the liquid crystal composition or the like therein from seeping out. In addition, this sealing may also obtain the effect of preventing deterioration of the liquid crystal element. In this case, as the end surface protection method, the end surface may be entirely covered, or curable resins or thermoplastic resins may be poured into the liquid crystal element from the end and solidified, and then covered with tapes.

A spacer such as a spherical or cylindrical glass, plastic, ceramic, or plastic film may be present between the substrates with a transparent conductive film arranged to face each other. By being contained as a component of the emulsion composition described below (hereinafter, may be referred to as the emulsion composition of the disclosure), the spacer may be present in the liquid crystal-polymer composite film between the substrates, or the spacer may be sprayed on the substrates during assembly of the liquid crystal element or may be mixed with an adhesive to be present in the adhesive layer.

The thickness of the substrate is preferably 25 μm or more and 250 μm or less and more preferably 50 μm or more and 200 μm or less. In the present specification, it is possible to measure the thickness by measuring the thickness at any five points on the measurement object using a micrometer and calculating the average value from the obtained values.

The thickness of the transparent conductive film is preferably 0.02 μm or more and 0.5 μm or less and more preferably 0.05 μm or more and 0.2 μm or less.

<<Method for Manufacturing Liquid Crystal-Polymer Composite Film>>

It is possible to manufacture the liquid crystal-polymer composite film of the disclosure by applying the emulsion composition of the disclosure described below on substrates with a transparent conductive film and carrying out drying. As the application method, it is possible to use a known application method such as bar coating, blade coating, knife coating, die coating, screen coating, microgravure roll coating, reverse roll coating, kiss roll coating, dip roll coating, spin coating, and spray coating. Depending on the properties of the substrate, the substrate may be washed as appropriate.

The wet film thickness at the time of application is preferably 10 µm or more and more preferably 20 µm or more. In addition, the wet film thickness is preferably 120 µm or less and more preferably 100 µm or less. By setting the wet film thickness to be the above lower limit value or more, it tends to be possible to carry out the application uniformly without any roughness or dense parts on the liquid crystal composition. By setting the wet film thickness to be the above upper limit value or less, the driving voltage tends to be reduced to a practical value and the haze in the transparent state tends to be reduced. Specifically, the wet film thickness at the time of application is preferably 10 µm or more and 120 µm or less and more preferably 20 µm or more and 100 µm or less.

The drying temperature when the emulsion composition is applied and dried is preferably 40° C. or higher and more preferably 50° C. or higher. In addition, the drying temperature is preferably 120° C. or lower, more preferably 100° C. or lower, and even more preferably 80° C. or lower. Specifically, the drying temperature when the emulsion composition is applied and dried is preferably 40° C. or higher and 120° C. or lower, more preferably 50° C. or higher and 100° C. or lower, and even more preferably 60° C. or higher and 80° C. or lower.

By setting the drying temperature to be the above lower limit value or more, the drying time is shortened to a practical time and the amount of moisture remaining in the film is reduced, which tends to improve the reliability of the liquid crystal element. By setting the drying temperature to be the above upper limit value or less, the emulsion composition tends to be less likely to undergo structural destruction such as coalescence or phase-inversion during drying. In addition, the liquid crystal-polymer composite film obtained by application and drying may be subjected to an annealing treatment as necessary.

The film thickness of the liquid crystal-polymer composite film after drying is preferably 5 µm or more and 100 µm or less, more preferably 10 µm or more and 80 µm or less, and even more preferably 20 µm or more and 50 µm or less.

The liquid crystal-polymer composite film of the disclosure preferably substantially does not include a medium containing water. In the liquid crystal-polymer composite film of the disclosure, the contained amount of the medium containing water is preferably 0% by mass or more and 1.0% by mass or less more preferably 0% by mass or more and 0.5% by mass or less, even more preferably 0% by mass or more and 0.01% by mass or less, and yet more preferably 0% by mass with respect to the mass of the liquid crystal-polymer composite film.

<<Method for Manufacturing Liquid Crystal Element>>

The method for manufacturing a liquid crystal element of the disclosure includes sandwiching the liquid crystal-polymer composite film of the disclosure between two substrates with a transparent conductive film.

One of the substrates with a transparent conductive film may be layered on top of the liquid crystal-polymer composite film formed on the other substrate with a transparent conductive film, or the liquid crystal-polymer composite film may be sandwiched between the two substrates with a transparent conductive film.

The method for manufacturing a liquid crystal element of the disclosure preferably further includes bonding these layers together by heating. The heating temperature is preferably 50° C. or higher and 100° C. or lower. The heating time is preferably 5 minutes to 1 hour.

The transparent conductive films of the two substrates with a transparent conductive film are preferably arranged to face each other with the liquid crystal-polymer composite film therebetween. The thickness of the liquid crystal element is preferably 150 µm or more and 500 µm or less, more preferably 200 µm or more and 400 µm or less, and even more preferably 250 µm or more and 300 µm or less.

<<Emulsion Composition>>

The emulsion composition of the disclosure is an emulsion composition in which a liquid crystal composition is dispersed in a medium composition containing water, where the medium composition is a medium including water in which a polymer and an acetylene alcohol are dispersed or dissolved.

The liquid crystal composition included in the emulsion composition of the disclosure is not particularly limited, but examples thereof include the liquid crystal composition used in the liquid crystal element of the disclosure described above. In addition, the medium including water included in the emulsion composition is also not particularly limited and examples thereof include pure water or a mixture of water and an organic solvent.

Examples of organic solvents include alcohols, ketones, ethers, esters, carboxylic acids, amines, and the like. The organic solvent may be water-soluble or oil-soluble to the extent of being slightly soluble in water, but it is preferable to mix an amount that dissolves uniformly with water.

The content ratio of the liquid crystal composition with respect to the mass of the emulsion composition of the disclosure is preferably 15% by mass or more and 40% by mass or less, more preferably 20% by mass or more and 35% by mass or less, and even more preferably 24% by mass or more and 32% by mass or less.

The content ratio of the liquid crystal component with respect to the mass of the emulsion composition of the disclosure is preferably 14% by mass or more and 36% by mass or less, more preferably 19% by mass or more and 32% by mass or less, and even more preferably 21% by mass or more and 28% by mass or less.

When the emulsion composition of the disclosure includes a dichroic dye, the content ratio of the dichroic dye is preferably 0.8% by mass or more and 4.0% by mass or less, more preferably 1.1% by mass or more and 3.6% by mass or less, and even more preferably 1.3% by mass or more and 3.2% by mass or less with respect to the mass of the emulsion composition of the disclosure.

When the emulsion composition of the disclosure includes a chiral agent, the content ratio of the chiral agent is preferably 0.01% by mass or more and 2.2% by mass or less, more preferably 0.02% by mass or more and 1.8% by mass or less, and even more preferably 0.04% by mass or more and 1.0% by mass or less with respect to the mass of the emulsion composition of the disclosure.

In the emulsion composition of the disclosure, the content ratio of the liquid crystal component is preferably 85% by mass or more and 99% by mass or less, more preferably 88% by mass or more and 97% by mass or less, and even more preferably 90% by mass or more and 95% by mass or less with respect to the mass of the liquid crystal composition.

When the emulsion composition of the disclosure includes a dichroic dye, the content ratio of the dichroic dye in the emulsion composition of the disclosure is preferably 1% by mass or more and 13% by mass or less, more preferably 3% by mass or more and 12% by mass or less, and even more preferably 5% by mass or more and 11% by mass or less with respect to the mass of the liquid crystal composition.

When the emulsion composition of the disclosure includes a chiral agent, the content ratio of the chiral agent in the emulsion composition of the disclosure is preferably 0.1% by mass or more and 6.0% by mass or less and more preferably 0.2% by mass or more and 3.0% by mass or less with respect to the mass of the liquid crystal composition.

The content ratio of the medium composition is preferably 60% by mass or more and 85% by mass or less, more preferably 65% by mass or more and 80% by mass or less, and even more preferably 68% by mass or more and 76% by mass or less with respect to the mass of the emulsion composition of the disclosure.

The content ratio of the polymer is preferably 9% by mass or more and 30% by mass or less, more preferably 12% by mass or more and 23% by mass or less, and even more preferably 13% by mass or more and 21% by mass or less with respect to the mass of the emulsion composition of the disclosure.

The content ratio of the acetylene alcohol is preferably 0.4% by mass or more and 5% by mass or less, more preferably 0.9% by mass or more and 4.5% by mass or less, and even more preferably 1.3% by mass or more and 4% by mass or less with respect to the mass of the emulsion composition of the disclosure.

The content ratio of the medium containing water is preferably 42% by mass or more and 59% by mass or less, more preferably 45% by mass or more and 56% by mass or less, and even more preferably 48% by mass or more and 53% by mass or less with respect to the mass of the emulsion composition of the disclosure.

The content ratio of the water is preferably 42% by mass or more and 52% by mass or less, more preferably 44% by mass or more and 50% by mass or less, and even more preferably 46% by mass or more and 48% by mass or less with respect to the mass of the emulsion composition of the disclosure.

When the emulsion composition of the disclosure includes an organic solvent, the content ratio of the organic solvent is preferably 0.1% by mass or more and 7% by mass or less, more preferably 1% by mass or more and 6% by mass or less, and even more preferably 2% by mass or more and 5% by mass or less with respect to the mass of the emulsion composition of the disclosure.

In the emulsion composition of the disclosure, the content ratio of the polymer is preferably 14% by mass or more and 35% by mass or less, more preferably 17% by mass or more and 30% by mass or less, and even more preferably 19% by mass or more and 27% by mass or less with respect to the mass of the medium composition.

In the emulsion composition of the disclosure, the content ratio of the acetylene alcohol is preferably 0.5% by mass or more and 7% by mass or less, more preferably 1% by mass or more and 6% by mass or less, and even more preferably 2% by mass or more and 5% by mass or less with respect to the mass of the medium composition.

In the emulsion composition of the disclosure, the content ratio of the medium containing water is preferably 60% by mass or more and 80% by mass or less, more preferably 63% by mass or more and 78% by mass or less, and even more preferably 68% by mass or more and 75% by mass or less with respect to the mass of the medium composition.

In the emulsion composition of the disclosure, the content ratio of the water is preferably 55% by mass or more and 72% by mass or less, more preferably 60% by mass or more and 70% by mass or less, and even more preferably 62% by mass or more and 68% by mass or less with respect to the mass of the medium composition.

When the emulsion composition of the disclosure includes an organic solvent, the content ratio of the organic solvent in the emulsion composition of the disclosure is preferably 0.1% by mass or more and 9% by mass or less, more preferably 1% by mass or more and 8% by mass or less, and even more preferably 1.5% by mass or more and 7% by mass or less with respect to the mass of the medium composition.

Examples of the polymer dispersed or dissolved in the medium include the polymers forming the polymer matrix of the liquid crystal-polymer composite film of the disclosure described above.

In addition, examples of the acetylene-based surfactant dispersed or dissolved in the medium include the acetylene-based surfactants used in the liquid crystal-polymer composite film of the disclosure described above.

The content ratio of the acetylene-based surfactant is preferably 0.1% by mass or more, more preferably 0.5% by mass or more, and even more preferably 1% by mass or more with respect to the total mass of the emulsion composition of the disclosure. In addition, the content ratio is preferably 10% by mass or less and more preferably 5% by mass or less. When the content ratio is the above lower limit or more, the liquid crystal composition tends to be stabilized, and when the content ratio is the above upper limit or less, the acetylene alcohol tends to be uniformly dispersed in the emulsion composition. Specifically, the content ratio of the acetylene-based surfactant is preferably 0.1% by mass or more and 10% by mass or less, more preferably 0.5% by mass or more and 8% by mass or less, and even more preferably 1% by mass or more and 5% by mass or less with respect to the total mass of the emulsion composition of the disclosure.

In the disclosure, a dispersion of a polymer and an acetylene alcohol refers to a state in which particles of the polymer and the acetylene alcohol are suspended in a medium, and dissolution of a polymer and an acetylene alcohol refers to a state in which the polymer and the acetylene alcohol are dissociated to be sufficiently small by solvation to form a homogeneous system. For details on dispersion and dissolution of polymers, refer to "Color Materials", Japan Society of Colour Material (2004), Vol. 77, No. 4, pp. 169-176.

In the emulsion composition of the disclosure, the liquid crystal composition is dispersed in a medium including water, but may be dispersed in a liquid state as is or may be dispersed in the form of microencapsulated liquid crystals in which the periphery of the liquid crystal composition is encapsulated using a polymer, a silica compound, inorganic nanoparticles, or the like. Examples of polymers serving as capsules in microencapsulated liquid crystals include natural polymers such as gelatin and gum arabic; synthetic polymers such as polyvinyl alcohol, polyurethane, polyurea, polyacryl, polyamine, polyamide, polyethylene, polypropylene, polystyrene, and polyacrylonitrile, and modified products thereof; and copolymers such as methacrylate/acrylonitrile, urethane/acrylate, and acrylate/acrylonitrile; and the like.

The emulsion composition of the disclosure may contain additives in a range in which the performance of the liquid crystal element manufactured using the emulsion composition is not impaired. Specific examples of additives include emulsifiers, dispersants, anti-settling agents, film-forming aids, leveling agents, light stabilizers, antioxidants, thickeners, polymerization inhibitors, photosensitizers, adhesives, defoaming agents, water-soluble dyes, chiral agents, and the like.

From the viewpoint of the transparency of the obtained liquid crystal element, as the size of the liquid crystal composition in the emulsion composition of the disclosure, an average particle size of 2 µm or more is preferable and an average particle size of 5 µm or more is more preferable. In addition, the average particle size is preferably 50 µm or less and more preferably 30 µm or less. By setting the average particle size to be the above lower limit value or more, the light scattering of the obtained liquid crystal-polymer composite film tends to be weak and the haze in the transparent state tends to be small. By setting the average particle size to be the above upper limit value or less, the graininess of the liquid crystal composition tends to disappear and the uniformity of the appearance of the obtained liquid crystal element tends to be favorable. Specifically, from the viewpoint of the transparency of the obtained liquid crystal element, for the size of the liquid crystal composition in the emulsion composition of the disclosure, an average particle size of 2 µm or more and 50 µm or less is preferable and an average particle size of 5 µm or more and 30 µm or less is more preferable. It is possible to measure the size of the liquid crystal composition in the emulsion composition of the disclosure using a dynamic light scattering method, which can measure the particle size even in a relatively high concentration state.

Meanwhile, from the viewpoint of the light scattering property of the obtained liquid crystal element, the average particle size of the liquid crystal composition is preferably 0.01 µm or more and more preferably 0.1 µm or more. In addition, the average particle size is preferably 2 µm or less and more preferably 1 µm or less. By setting the average particle size to less than the above upper limit value, the light scattering of the obtained liquid crystal-polymer composite film tends to be strong, the haze in the scattering state tends to be large, and the dynamic range (haze difference between the scattering state and the transparent state) tends to be large. By setting the average particle size of the liquid crystal composition to be the above lower limit value or more, it is easy to prevent the average particle size from becoming excessively small (much smaller than the visible light wavelength) and reducing the effect thereof. Specifically, from the viewpoint of the light scattering property of the obtained liquid crystal element, the average particle size of the liquid crystal composition in the emulsion composition of the disclosure is preferably 0.01 µm or more and less than 2 µm and more preferably 0.1 µm or more and 1 µm or less.

The above average particle size is the median diameter based on numbers. The shape and average particle size of the liquid crystal composition are as described above for the liquid crystal composition of the disclosure.

When the total mass of the polymer and the acetylene alcohol dispersed or dissolved in the medium in the emulsion composition of the disclosure is 1, the total mass of the liquid crystal composition is preferably 0.5 or more and more preferably 1 or more. In addition, the liquid crystal composition is preferably 4 or less and more and preferably 3 or less. By setting the total mass of the liquid crystal composition to be the above lower limit value or more with respect to the total mass of the polymer and acetylene alcohol, the haze in the transparent state of the liquid crystal element obtained using the emulsion composition of the disclosure tends to be low and the durability at high temperatures tends to be improved. By setting the total mass of the liquid crystal composition to be the above upper limit value or less with respect to the total mass of the polymer and acetylene alcohol, the impact resistance and adhesion of the liquid crystal element obtained using the emulsion composition of the disclosure tend to be improved. Specifically, the mass ratio expressed by [liquid crystal composition]/[polymer+acetylene alcohol] is preferably 0.5 or more and 4 or less and more preferably 1 or more and 3 or less.

<<Method for Manufacturing Emulsion Composition>>

The method for manufacturing the emulsion composition of the disclosure is not particularly limited, but it is possible to carry out the manufacturing using the following methods, for example.

Manufacturing method (1): A manufacturing method including a step of mixing a liquid crystal composition as an oil phase with a medium containing water as an aqueous phase and carrying out emulsification, and then a step of adding a liquid in which a polymer and an acetylene alcohol are dispersed or dissolved in a medium containing water.

Manufacturing method (2): A manufacturing method including a step of mixing a liquid crystal composition as an oil phase with a liquid in which polymer and acetylene alcohol are dispersed or dissolved in a medium containing water as an aqueous phase and carrying out emulsification.

Manufacturing method (3): A manufacturing method including a step of mixing a powder or slurry of a microencapsulated liquid crystal in which the periphery of the liquid crystal composition is encapsulated with a polymer, a silica compound, inorganic nanoparticles, or the like, with a liquid including an acetylene alcohol and a medium containing water and dispersing the microencapsulated liquid crystal, and then a step of adding a liquid in which a polymer is dispersed or dissolved in a medium containing water.

Manufacturing method (4): A manufacturing method including a step of mixing a liquid in which a polymer and an acetylene alcohol are dispersed or dissolved, with a liquid including a powder or slurry of the microencapsulated liquid crystal and a medium containing water and dispersing the microencapsulated liquid crystal.

Manufacturing method (5): A manufacturing method including a step of mixing a liquid crystal composition as an oil phase with a liquid containing a medium containing water and an acetylene alcohol as an aqueous phase and carrying out emulsification, and then a step of adding a liquid in which a polymer is dispersed or dissolved in a medium containing water.

Among the above, the manufacturing methods (1), (3), and (5) make it possible to carry out the manufacturing with low energy because the emulsification step or dispersion step can be performed while the mixture is in a low viscosity state, and further, the particle size of the liquid crystal composition is easily controlled, thus the manufacturing methods (1), (3), and (5) are preferable.

As the liquid in which a polymer is dispersed or dissolved in a medium containing water, it is possible to use a commercially available aqueous resin emulsion. In addition, as a liquid in which a polymer and acetylene alcohol are dispersed or dissolved in a medium containing water, it is possible to use a commercially available aqueous resin emulsion in which an acetylene alcohol is dispersed or dissolved.

Specific examples of commercially available aqueous resin emulsions are listed below. Aqueous urethane emulsions: NeoRez R-9660, NeoRez R-972, NeoRez R-9637, NeoRez R-9679, NeoRez R-960, NeoRez R-2170, NeoRez R-966, NeoRez R-967, NeoRez R-986, NeoRez R-9603, NeoRez R-4000, NeoRez R-9404, NeoRez R-600, NeoRez R-650, and NeoRez R-1010, which are manufactured by DSM; Superflex 126, Superflex 130, Superflex 150, Superflex 150HS, Superflex 170, Superflex 210, Superflex 300, Superflex 420, Superflex 420NS, Superflex 460, Superflex 460S, Superflex 470, Superflex 500M, Superflex 620, Superflex 650, Superflex 740, Superflex 820, Superflex 830HS, Superflex 860, Superflex 870, Superflex E-2000, and Superflex E-4800, which are manufactured by DKS Co., Ltd.; and Neo-Sticker 200, Neo-Sticker 400, Neo-Sticker 700, Neo-Sticker 1200, Neo-Sticker X-7096, Evafanol HA-107C, Evafanol HA-50C, Evafanol HA-170, Evafanol HA-560, Evafanol HA-15, Evafanol AP-12, and Evafanol APC-55, which are manufactured by Nicca Chemical Co., Ltd.

Aqueous acrylic emulsions: NeoCryl A-633, NeoCryl A-639, NeoCryl A-655, NeoCryl A-662, NeoCryl A-1091, NeoCryl A-1092, NeoCryl A-1093, NeoCryl A-1094, NeoCryl A-2091, NeoCryl A-2092, NeoCryl A-6016, NeoCryl A-6057, NeoCryl A-6069, NeoCryl A-6092, NeoCryl A-614, NeoCryl A-550, NeoCryl A-1105, NeoCryl A-1125, NeoCryl A-1127, NeoCryl XK-12, NeoCryl XK-16, NeoCryl XK-30, NeoCryl XK-36, NeoCryl XK-52, NeoCryl XK-190, NeoCryl XK-188, and NeoCryl XK-240, which are manufactured by DSM; Rikabond 702, Rikabond 727, Rikabond 743N, Rikabond 745, Rikabond 752, Rikabond 801, Rikabond 940, Rikabond 972, Rikabond 1711, Rikabond 1752, Rikabond 6520, Rikabond 6720, Rikabond 7110, Rikabond 7180, Rikabond 7525, Rikabond 7820, Rikabond 8020, Rikabond 8030, Rikabond DM60, Rikabond DM772, Rikabond DM774, Rikabond LDM6740, Rikabond LDM7522, Rikabond LDM7523, Rikabond ES-65, Rikabond ES-90, Rikabond ES-620, Rikabond ET-700, Rikabond ET-831, Rikabond HS-5, Rikabond HS-531, Rikabond AP-601, Rikabond AP-96, Rikabond AP-620, Rikabond AP-700, Rikabond AP-80, Rikabond 710A, Rikabond 730L, Rikabond 731L, Rikabond 952B, Rikabond 966A, Rikabond 7320, Rikabond 7400, Rikabond FK-420, Rikabond FK-64S, Rikabond FK-66IS, FK-66N, FK-68H, Rikabond FK-471, Rikabond FK-475, Rikabond FK-489, Rikabond FK-284, Rikabond FK-600S, Rikabond FK-3830, Rikabond FK-3840, Rikabond FK-6100, Mowinyl VDM7410, Mowinyl 4061, Mowinyl 4080, Mowinyl 4090, Mowinyl 4050, Mowinyl S-71, Mowinyl 461, Mowinyl 650, Mowinyl AP-60L, and Mowinyl 490, which are manufactured by Japan Coating Resin Corporation; and ThreeBond 1549, ThreeBond 1549B, ThreeBond 1555C, and ThreeBond 1555D, which are manufactured by ThreeBond Co., Ltd.

Among the above, NeoRez R-966, NeoRez R-967, NeoCryl A-1125, NeoCryl A-1127, Rikabond FK-471, Rikabond ES-620, Rikabond LDM7522, Mowinyl 4061, Mowinyl 4080, Mowinyl 4090, and ThreeBond 1549 have excellent oil phase dispersion stability, and are thus preferable.

In order to obtain a stable emulsion, a surfactant other than acetylene alcohol (hereinafter, also referred to as "other surfactants") or a dispersion stabilizer may be added at a stage prior to the emulsification step or dispersion step. The other surfactants are not particularly limited and may be ionic or non-ionic, low molecular or high molecular, non-reactive or reactive.

The added amount of the other surfactants is not particularly limited, but when the emulsion composition of the disclosure includes the other surfactants, the contained amount of the other surfactants is preferably 0.1% by mass or more and more preferably 0.5% by mass or more with respect to the mass of the emulsion composition. In addition, the added amount is preferably 20% by mass or less and more preferably 10% by mass or less. By setting the added amount of the other surfactants to be within the above range, the dispersion of the emulsion is stabilized and the particle size of the liquid crystal composition tends to be controllable within a desired range. Specifically, when the emulsion composition of the disclosure includes the other surfactants, the contained amount of the other surfactants is preferably 0.1% by mass or more and 20% by mass or less and more preferably 0.5% by mass or more and 10% by mass or less with respect to the mass of the emulsion composition.

The above surfactant may be added to the liquid crystal composition or added to a medium containing water, depending on the solubility.

Examples of surfactants include the following or the like.
Anionic surfactants such as carboxylates, sulfonates, sulfates, and phosphates;
Cationic surfactants such as amine salts and quaternary ammonium salts;
Amphoteric surfactants such as alkylamino fatty acid salts, alkylamine oxides, betaines, sulfobetaines, amidosulfobetaines, carbobetaines, and imidazolines;
Non-ionic surfactants such as ether types such as polyoxyethylene alkyl ethers, polyoxyethylene alkylaryl ethers, polyoxyethylene aralkyl ethers, polyoxyethylene aralkyl aryl ethers, polyoxyethylene polyoxypropylene block adducts, alkyl glucosides, and polyether-modified silicones; ester types such as glycerin fatty acid esters, sorbitan fatty acid esters, and sucrose fatty acid esters; ester/ether types such as polyoxyethylene fatty acid esters, polyoxyethylene sorbitan fatty acid esters, and polyoxyethylene sucrose fatty acid esters; acetyl types such as acetyl-modified polyvinyl alcohol; and fatty acid alkanolamides.

Among the above, anionic surfactants are preferable in terms of high water solubility and dispersion stability, and sulfonates are particularly preferable. In addition, non-ionic surfactants tend to make it possible to achieve an increase in the electrical reliability of the liquid crystal element, thus the non-ionic surfactants are preferable. Among the above, ether or ester types are preferable, and polyoxyethylene alkyl ethers, polyoxyethylene alkylaryl ethers, polyoxyethylene aralkyl ethers, polyoxyethylene aralkyl aryl ethers, polyoxyethylene polyoxypropylene block adducts, and the like are particularly preferable.

The dispersion stabilizer is not particularly limited, but examples thereof include the following or the like.

Polymers, such as polyvinyl alcohol, polyvinylpyrrolidone, methyl cellulose, hydroxyethyl cellulose, hydroxypropyl cellulose, hydroxypropyl methyl cellulose, polyethylene glycol, polyacrylic acid, polymethacrylic acid, polyurethane, polyamine, polyamide, polyether, maleic acid copolymers, gelatin, starch, chitosan, and corn starch, and modified products thereof;
Copolymers such as methacrylate/acrylonitrile, urethane/acrylate, and acrylate/acrylonitrile;
Fine particles of inorganic oxides, such as silica fine particles, titania fine particles, and alumina fine particles.

Among the above, polyvinyl alcohol and modified products thereof, polyurethane, polyamide, and the like have high dispersion stability, and are thus preferable.

Examples of dispersion stabilizers include the examples given as polymers that form the polymer matrix, which are included as polymers that form the polymer matrix when included in the emulsion composition or liquid crystal-polymer composite film.

The degree of saponification of polyvinyl alcohol is preferably 80 mol % or more and more preferably 85 mol % or more. In addition, the degree of saponification is preferably 95 mol % or less and more preferably 91 mol % or less. When the degree of saponification is within these ranges, the solubility in a medium containing water tends to be high. Specifically, the degree of saponification of the polyvinyl alcohol is preferably 80 mol % or more and 95 mol % or less and more preferably 85 mol % or more and 91 mol % or less. In the present specification, it is possible to measure the degree of saponification by the method described in ISO15023-2 or Japanese Industrial Standard K6726-1994.

The degree of polymerization of the polyvinyl alcohol is preferably 100 or more and more preferably 300 or more. In addition, the degree of polymerization is preferably 2500 or less and more preferably 1000 or less. By setting the degree of polymerization to be within these ranges, the film tends to have excellent flexibility. Specifically, the degree of polymerization of the polyvinyl alcohol is preferably 100 or more and 2500 or less and more preferably 300 or more and 1,000 or less.

In the present specification, it is possible to measure the degree of polymerization of polyvinyl alcohol by the method described in ISO15023-2 or Japanese Industrial Standards K6726-1994.

Specific examples of polyvinyl alcohols include Gohsenol GL-03, Gohsenol GL-05, Gohsenol GM-14L, Gohsenol GM14, Gohsenol GH-17, Gohsenol GH-17R, Gohsenol GH-20, Gohsenol GH-23, Gohsenol AL-06, Gohsenol P-610, and Gohsenol C-500, which are manufactured by Mitsubishi Chemical Corporation; and Kuraray Poval 25-88KL, Kuraray Poval 32-97KL, Kuraray Poval 3-86SD, Kuraray Poval 105-88KX, and Kuraray Poval 200-88KX, which are manufactured by Kuraray Co., Ltd.; Denka Poval H-12, Denka Poval H-17, Denka Poval H-24, Denka Poval B-05, Denka Poval B-17, Denka Poval B-20, Denka Poval B-24, and Denka Poval B-33, which are manufactured by Denka Co., Ltd., and the like.

When the emulsion composition of the disclosure includes a dispersion stabilizer, the contained amount of the dispersion stabilizer is preferably 0.1% by mass or more and 3% by mass or less and more preferably 0.1% by mass or more and 2% by mass or less with respect to the mass of the emulsion composition.

In the manufacturing of the emulsion compositions, the emulsification method and dispersion method are not particularly limited and examples thereof include a method for mechanically crushing particles using a stirrer, a homogenizer, a homomixer, a disperser, a high-pressure emulsifier, a blender, a colloid mill, an ultrasonic disperser, or the like; a method for pushing liquid through holes using a porous membrane, microchannel, inkjet, or the like; and the like.

Among the above, when manufacturing an emulsion composition in which the average particle size of the liquid crystal composition is 2 µm or more and 50 µm or less, a method for pushing liquid through holes using a porous membrane (membrane emulsification method) enables precise control of the particle size distribution of the particles and makes manufacturing easy, which is preferable. The porous membrane is not particularly limited, but it is possible to use Shirasu porous glass and the like.

When manufacturing an emulsion composition in which the liquid crystal composition has an average particle size of 0.01 µm or more and less than 2 µm, it is possible to easily manufacture a uniform emulsion composition by first manufacturing an emulsion composition in which the average particle size of the liquid crystal composition is 2 µm or more and 50 µm or less by the membrane emulsification method or the like and then mechanically crushing the particles using a high-pressure emulsifier or ultrasonic disperser.

In addition to the polymer matrix component and the acetylene-based surfactant component, the emulsion composition may contain a compound having a high dielectric constant. By using a compound having a high dielectric constant, the relative dielectric constant of the liquid crystal-polymer composite film tends to increase and the driving voltage tends to decrease. Examples of compounds having a high dielectric constant include organic compounds having polar groups, and inorganic particles.

Examples of the organic compounds having a polar group include alcohol compounds other than acetylene alcohol, cyano compounds, carbonyl compounds, and amino compounds. In particular, the alcohol compounds tend to have high hydrophilicity, be uniformly dispersible when mixed into the emulsion composition, and be able to improve the relative dielectric constant of the liquid crystal-polymer composite film, thus the alcohol compounds are preferable. In particular, the liquid crystal-polymer composite film of the disclosure preferably contains an alcohol having 5 or less carbon atoms other than acetylene alcohol.

By containing the compound together with the acetylene-based surfactant, it is possible to obtain a liquid crystal element having excellent driving properties at low voltage and low power consumption.

Examples of the alcohol having 5 or less carbon atoms include methanol, ethanol, propanol, isopropanol, butanol, pentanol, ethylene glycol, and glycerin.

The alcohol having 5 or less carbon atoms may also be bonded to a functional group other than a hydroxyl group. In addition, only one type may be used, or two or more types may be mixed and used.

As the alcohol having 5 or less carbon atoms, a polyhydric alcohol having two or more hydroxyl groups is preferable. With a polyhydric alcohol, hydrogen bonds between molecules increase, the boiling point increases, and it tends to be possible to suppress volatilization of the alcohol during film formation. From the viewpoint of viscosity, the number of hydroxyl groups in the polyhydric alcohol is preferably 2 or more and 4 or less.

Examples of polyhydric alcohols include ethylene glycol and glycerin, in which ethylene glycol is particularly preferable.

The added amount of the compound is not particularly limited, but is preferably 0.5 parts by mass or more and more preferably 1 part by mass or more with respect to 100 parts by mass of the liquid crystal composition. In addition, the added amount is preferably 40 parts by mass or less and more preferably 30 parts by mass or less. By setting the added amount of the compound to be within the above range, the obtained liquid crystal element tends to have excellent driving properties at low voltage. Specifically, when the emulsion composition of the disclosure includes the compound, the contained amount of the compound in the emulsion composition is preferably 0.5 parts by mass or more and 40 parts by mass or less and more preferably 1 part by mass or more and 30 parts by mass or less with respect to 100 parts by mass of the liquid crystal composition.

When the emulsion composition of the disclosure includes the compound, the contained amount of the compound is preferably 0.1% by mass or more and 10% by mass or less and more preferably 0.2% by mass or more and 8% by mass or less with respect to the mass of the emulsion composition.

A cross-linking agent may be used in the emulsion composition as appropriate. The use of a cross-linking agent tends to improve the water resistance and impact resistance of the liquid crystal-polymer composite film.

The cross-linking agent is not particularly limited, but examples thereof include the following.

Epoxy-based compounds such as ethylene glycol diglycidyl ether, polyethylene glycol diglycidyl ether, propylene glycol diglycidyl ether, polypropylene glycol diglycidyl ether, glycerol diglycidyl ether, polyglycerin polyglycidyl ether, and diglycidylaniline;

Epoxysilane-based compounds such as γ-glycidoxypropyltrimethoxysilane, γ-glycidoxypropyltriethoxysilane, γ-glycidoxypropyldimethoxymethylsilane, γ-glycidoxypropyldiethoxymethylsilane, β-(3,4-epoxycyclohexyl)ethyltrimethoxysilane, and β-(3,4-epoxycyclohexyl)ethyltriethoxysilane;

Aminosilane-based compounds such as 3-aminopropyltrimethoxysilane, 3-aminopropyltriethoxysilane, N-(2-aminoethyl)-3-aminopropyltrimethoxysilane, and N-(2-aminoethyl)-3-aminopropylmethyldimethoxysilane;

Mercaptosilane-based compounds such as γ-mercaptopropyltrimethoxysilane; Hydrazide-based compounds such as carbodihydrazide, oxalic acid dihydrazide, adipic acid dihydrazide, sebacic acid dihydrazide, and isophthalic acid dihydrazide;

Semicarbazide resins;

Polycarbodiimide-based resins;

Aziridine-based (ethyleneimino group-containing) compounds such as tetramethylolmethane-tris(β-aziridinylpropionate), trimethylolpropane-tris(β-aziridinylpropionate), methylene bis[N-(1-aziridinylcarbonyl)-4-aniline], N,N'-hexamethylene bis(1-aziridinecarboamide), and N,N'-hexaaminoethylene-1,6-bis(1-aziridinecarboxamide);

Acetoacetoxy group-containing compounds; oxazoline group-containing compounds;

Polyethylene polyamines; polyethylene imines; polyamide polyamines; polyamide polyureas; alkylated polymethylol melamines; glyoxal;

Water-dispersible isocyanates; blocked isocyanates; carbodiimide group-containing compounds; bisvinyl sulfones; and lactic acid titanates.

When epoxy-based compounds and epoxysilane-based compounds are used, catalysts such as imidazole-based compounds, amine-based compounds, or phosphorus-based compounds may be added.

Among the above, hydrazide-based compounds, oxazoline group-containing compounds, carbodiimide group-containing compounds, and blocked isocyanates have a fast cross-linking rate and low toxicity, and are thus preferable.

It is possible to use the polymer and the cross-linking agent in any combination, but the combination of polyurethane and an oxazoline group-containing compound, the combination of polyurethane and a carbodiimide group-containing compound, the combination of polyurethane and a blocked isocyanate, and the combination of polyacryl and a hydrazide-based compound have a high cross-linking reactivity, and are thus preferable. In addition, from the viewpoint of the stability of the obtained emulsion composition, the combination of polyacryl and a carbodiimide group-containing compound is preferable.

The added amount of the cross-linking agent is not particularly limited, but is preferably 0.1 parts by mass or more and more preferably 1 part by mass or more with respect to 100 parts by mass of the polymer to be cross-linked. In addition, the added amount is preferably 20 parts by mass or less and more preferably 10 parts by mass or less. By setting the added amount of the cross-linking agent to be within the above range, the water resistance and impact resistance of the liquid crystal-polymer composite film tend to be improved and the flexibility tends to be maintained.

Specifically, when the emulsion composition of the disclosure includes a cross-linking agent, the contained amount of the cross-linking agent in the emulsion composition is preferably 0.1 parts by mass or more and 20 parts by mass or less and more preferably 1 part by mass or more and 10 parts by mass or less with respect to 100 parts by mass of the polymer to be cross-linked.

When the emulsion composition of the disclosure includes a cross-linking agent, the contained amount of the cross-linking agent is preferably 0.01% by mass or more and 10% by mass or less and more preferably 0.1% by mass or more and 5% by mass or less with respect to the mass of the emulsion composition.

For the addition timing of the cross-linking agent, a one-liquid type added to the emulsion composition from the beginning may be used, or a two-liquid type added immediately before application on the substrate may be used.

The viscosity of the emulsion composition of the disclosure at 25° C. is preferably 10 mPa·s or more and more preferably 100 mPa·s or more. In addition, the viscosity is preferably 10,000 mPa·s or less and more preferably 2,000 mPa·s or less. By setting the viscosity at 25° C. to be within the above range, it is easier to apply the liquid crystal-polymer composite film with a uniform film thickness, it is possible to increase the application speed, and productivity tends to be increased. It is possible to measure the above viscosity using a B-type viscometer in accordance with standard methods.

Specifically, the viscosity of the emulsion composition of the disclosure at 25° C. is preferably 10 mPa·s or more and 10,000 mPa·s or less and more preferably 100 mPa·s or more and 2,000 mPa·s or less.

In order to keep the viscosity of the emulsion composition of the disclosure within the above range, viscosity adjusters such as thickeners, thixotropic agents, and viscosity reducers may be used.

The viscosity adjusters are not particularly limited, but include the examples given as dispersion stabilizers.

The contained amount of the liquid crystal composition in the emulsion composition is preferably 20% by mass or more and more preferably 30% by mass or more with respect to 100% by mass of the emulsion composition. In addition, the contained amount is preferably 70% by mass or less and more preferably 65% by mass or less. By setting the contained amount of the liquid crystal composition to be within the above range, repelling that occurs when the emulsion composition is applied to a substrate is suppressed and it tends to be easier to keep the particle size of the liquid crystal composition and the viscosity of the emulsion composition within the above ranges. Specifically, the contained amount of the liquid crystal composition in the emulsion composition is preferably 20% by mass or more and 70% by mass or less and more preferably 30% by mass or more and 65% by mass or less with respect to 100% by mass of the emulsion composition.

The particle size of the polymer in the emulsion composition is preferably 1 nm or more and more preferably 10 nm or more. In addition, the particle size is preferably 1000 nm or less and more preferably 200 nm or less. By the particle size being within the above range, it tends to be easier to keep the viscosity of the emulsion composition within the above range. Specifically, the particle size of the polymer used in the emulsion composition is preferably 1 nm or more and 1,000 nm or less and more preferably 10 nm or more and 200 nm or less. It is possible to observe and measure the particle size using a scanning electron microscope (SEM) by removing moisture at the minimum film formation temperature (MFT) or lower and carrying out a conductivity-imparting treatment by sputtering Au or the like. In addition, the dynamic light scattering method enables particle size measurement even in a liquid state and in a relatively high concentration state, which is preferable.

In addition, the weight-average molecular weight of the polymer used in the emulsion composition is preferably $1.0 \times 10^3$ or more and more preferably $1.0 \times 10^4$ or more. In addition, the weight-average molecular weight is preferably $1.0 \times 10^6$ or less and more preferably $1.0 \times 10^5$ or less. By setting the molecular weight of the polymer to be within the above range, it tends to be easy to keep the viscosity of the emulsion composition within the above range. The weight-average molecular weight means a value calculated by gel permeation chromatography according to a standard method.

<<Visual Field Blocking Element>>

A visual field blocking element according to an example of an embodiment of the disclosure (also referred to as "the present visual field blocking element") is a visual field blocking element using the liquid crystal-polymer composite film of the disclosure, the liquid crystal element of the disclosure, or the emulsion composition of the disclosure.

It is possible to suitably use the present visual field blocking element as a light control shutter for the purpose of shading and adjusting daylighting, improving design, protecting privacy, and the like in windows, doors, partitions, and the like of vehicles such as trains and automobiles, and buildings such as business buildings and hospitals, for example.

<<Method for Manufacturing Visual Field Blocking Element>>

It is possible to manufacture the present visual field blocking element using the liquid crystal-polymer composite film of the disclosure, the liquid crystal element of the disclosure, or the emulsion composition of the disclosure.

When the liquid crystal-polymer composite film of the disclosure is used, it is possible to manufacture the present visual field blocking element by a manufacturing method including a step of molding a liquid crystal element created using the liquid crystal-polymer composite film of the disclosure.

When the liquid crystal element of the disclosure is used, it is possible to manufacture the present visual field blocking element by a manufacturing method including a step of molding the liquid crystal element of the disclosure. Examples of the molding method include cutting and molding, molding, and the like.

When the emulsion composition of the disclosure is used, it is possible to manufacture the present visual field blocking element by a manufacturing method including a step of molding a liquid crystal-polymer composite film created using the emulsion composition of the disclosure and a liquid crystal element using the same.

<<Uses>>

It is possible to use the acetylene-based surfactant including an acetylene alcohol of the disclosure as a surfactant for dispersing a liquid crystal composition in a polymer matrix in the liquid crystal-polymer composite film of the disclosure.

It is possible to use the acetylene-based surfactant including an acetylene alcohol of the disclosure as a surfactant for dispersing a liquid crystal composition in a medium including a polymer and water in the emulsion composition of the disclosure.

It is possible to use the acetylene-based surfactant including an acetylene alcohol of the disclosure as a surfactant for dispersing a liquid crystal composition in a polymer matrix in the liquid crystal element of the disclosure.

It is possible to use the acetylene-based surfactant including an acetylene alcohol of the disclosure as a surfactant for dispersing a liquid crystal composition in a polymer matrix in the visual field blocking element of the disclosure.

It is possible to use the acetylene-based surfactant including an acetylene alcohol of the disclosure to manufacture the liquid crystal-polymer composite film of the disclosure.

It is possible to use the acetylene-based surfactant including an acetylene alcohol of the disclosure to manufacture the emulsion composition of the disclosure.

It is possible to use the acetylene-based surfactant including an acetylene alcohol of the disclosure to manufacture the liquid crystal element of the disclosure.

It is possible to use the acetylene-based surfactant including an acetylene alcohol of the disclosure to manufacture the visual field blocking element of the disclosure.

The liquid crystal-polymer composite film of the disclosure includes a liquid crystal composition, a polymer matrix, and an acetylene alcohol.

It is possible to use the liquid crystal-polymer composite film of the disclosure for the liquid crystal element. For example, it is possible to use the liquid crystal-polymer composite film of the disclosure as the liquid crystal-polymer composite film in a liquid crystal element provided with two substrates with a transparent conductive film, the substrates being arranged such that the transparent conductive films face each other, and a liquid crystal-polymer composite film which is sandwiched between the two substrates with a transparent conductive film.

It is possible to use the liquid crystal-polymer composite film of the disclosure to manufacture a liquid crystal element provided with two substrates with a transparent conductive film, the substrates being arranged such that the transparent conductive films face each other, and a liquid crystal-polymer composite film which is sandwiched between the two substrates with a transparent conductive film.

It is possible to use the liquid crystal-polymer composite film of the disclosure to manufacture a visual field blocking element formed from a liquid crystal element provided with two substrates with a transparent conductive film, the substrates being arranged such that the transparent conductive films face each other, and a liquid crystal-polymer composite film which is sandwiched between the two substrates with a transparent conductive film.

The emulsion composition of the disclosure includes a liquid crystal composition, a polymer, an acetylene alcohol, and a medium including water.

In a liquid crystal element provided with two substrates with a transparent conductive film and a liquid crystal-polymer composite film, it is possible to use the emulsion composition of the disclosure to manufacture a liquid crystal-polymer composite film in a liquid crystal element provided with two substrates with a transparent conductive film, the substrates being arranged such that the transparent conductive films face each other, and a liquid crystal-polymer composite film which is sandwiched between the two substrates with a transparent conductive film.

In a liquid crystal element provided with two substrates with a transparent conductive film and a liquid crystal-polymer composite film, it is possible to use the emulsion composition of the disclosure to manufacture a liquid crystal element provided with two substrates with a transparent conductive film, the substrates being arranged such that the transparent conductive films face each other, and a liquid crystal-polymer composite film which is sandwiched between the two substrates with a transparent conductive film.

In a liquid crystal element provided with two substrates with a transparent conductive film and a liquid crystal-polymer composite film, it is possible to use the emulsion composition of the disclosure to manufacture a visual field blocking element formed from a liquid crystal element provided with two substrates with a transparent conductive film, the substrates being arranged such that the transparent conductive films face each other, and a liquid crystal-polymer composite film which is sandwiched between the two substrates with a transparent conductive film.

It is possible to use the liquid crystal element of the disclosure to manufacture a visual field blocking element.

It is possible to use the liquid crystal-polymer composite film of the disclosure to switch between a transparent state and a scattering state by applying a voltage.

It is possible to use the liquid crystal element of the disclosure to switch between a transparent state and a scattering state by applying a voltage.

It is possible to use the visual field blocking element of the disclosure to switch between a transparent state and a scattering state by applying a voltage.

Explanation of Terms

In the disclosure, when expressing "X to Y" (X and Y are any numbers), the meaning includes "X or more and Y or less" as well as "preferably greater than X" or "preferably smaller than Y" unless otherwise specified.

In addition, when expressing "X or more" (X is any number) or "Y or less" (Y is any number), the meaning also includes "preferably greater than X" or "preferably less than Y".

EXAMPLES

Next, the disclosure will be described in more detail using Examples and Comparative Examples, but the disclosure is not limited to the following Examples as long as the gist of the disclosure is not exceeded.

Example 1

A nematic liquid crystal with $\Delta n=0.095$ and NI point=129.5° C. and a chiral agent ((R)-4-cyano-4'(2-methyl)butylbiphenyl, product name: CB-15, manufactured by Merck) were mixed using the following blend to obtain a liquid crystal composition (L-1).
<Liquid Crystal Composition Blend>
Nematic liquid crystal: 96.8% by mass
CB-15:3.2% by mass
45 parts by mass of demineralized water and 10 parts by mass of an acetylene-based surfactant (A-1: PD-002W, manufactured by Nissin Chemical Industry Co., Ltd., HLB value 9-10, non-volatile component 83%: all catalog values) were added with respect to 45 parts by mass of the liquid crystal composition (L-1) and emulsified through Shirasu porous glass (pore diameter 10 μm) to obtain an o/w emulsion (E-1).

7.3% by mass of a 20% aqueous solution of polyvinyl alcohol Gohsenol GH-17R (manufactured by Mitsubishi Chemical Corporation) was added to 92.7% by mass of the aqueous acrylic emulsion Rikabond LDM7522 (manufactured by Japan Coating Resin Corporation, non-volatile component 51%) and stirred to obtain a white latex (W-1).

45 parts by mass of the white latex (W-1) was added to 55 parts by mass of the o/w emulsion (E-1) and stirred until homogenous to obtain an emulsion composition (I-1).

As a substrate 1, a film was used in which a transparent ITO electrode was formed as a film on a PET film substrate having a thickness of 125 μm. The emulsion composition (I-1) was applied on the ITO electrode of this substrate using a bar coater and dried at 90° C. to form a liquid crystal-polymer composite film 1 having a film thickness of 30 μm to obtain a laminate 1 in which a liquid crystal-polymer composite film 1 was formed on the substrate 1.

The substrate 1 was further layered on the laminate 1 such that the ITO electrode faced the laminate 1 via the liquid crystal-polymer composite film 1, and was heated at 80° C. and bonded to obtain a liquid crystal element (F-1).

The haze and total light transmittance of the liquid crystal element (F-1) obtained in Example 1 were measured when the applied voltage (a square wave having a frequency of 100 Hz and 100 Vrms) was ON/OFF, before and after being left in a thermostatic chamber at 110° C. for 90 hours.

Table 1 shows the results of the haze, total light transmittance, haze change range ΔHaze, and total light transmittance change range ΔTT for Example 1.

TABLE 1

| | Applied voltage | OFF | ON |
|---|---|---|---|
| Haze (%) | Initial | 82.2 | 9.7 |
| | After being left for 90 hours | 85.9 | 10.4 |
| | ΔHaze | 3.7 | 0.7 |
| Total light transmittance (%) | Initial | 89.7 | 88.5 |
| | After being left for 90 hours | 89.3 | 87.8 |
| | ΔTT | 0.4 | 0.7 |

The liquid crystal element (F-1) of Example 1 exhibited normal mode driving in which the liquid crystal element (F-1) was in a scattering state when the voltage was OFF and in a transparent state when the voltage was ON.

Before and after being left in a thermostatic chamber at 110° C. for 90 hours, the ΔHaze when the voltage was ON/OFF was within 4% for both and the ΔTT was within 1% for both.

Accordingly, it was found that no significant deterioration in optical performance was observed before and after the durability test at high temperatures. From an optical microscope, no change in the liquid crystal diameter was observed before and after the durability test at high temperatures, confirming that the liquid crystal element had excellent durability at high temperatures.

Example 2

As a liquid crystal composition (L-2), a nematic liquid crystal with $\Delta n=0.096$ and NI point=143.3° C. was used without mixing a chiral agent therewith. After passing through a Shirasu porous glass (pore diameter 10 μm), the nematic liquid crystal was emulsified using an ultrasonic disperser to obtain an o/w emulsion (E-2). In addition, SV-02 (containing polycarbodiimide, product name Car bodilite) manufactured by Nisshinbo Chemical Inc. was used as a cross-linking agent. Except for the above, an emulsion composition (I-2) was adjusted using the same method as in Example 1. The formulation table is shown in Table 2. The numerical values in the table indicate "parts by mass".

Furthermore, a liquid crystal element (F-2) was created using the same method as in Example 1 and the optical properties (haze and total light transmittance) were measured before and after the durability test. The conditions of the durability test were being left in a thermostatic chamber at 110° C. for 100 hours.

The optical properties before and after the durability test and the differences therebetween are shown in Table 3.

Examples 3 to 7

Emulsion compositions were adjusted in the same manner as in Example 2 while changing the liquid crystal compositions and acetylene-based surfactants used, liquid crystal elements were created, and the optical properties before and after the durability test were measured.

The formulation table is shown in Table 2 and the optical properties before and after the durability test and the differences therein are shown in Table 3.

The liquid crystal compositions and acetylene-based surfactants used are as follows.
[Liquid Crystal Compositions]
Liquid Crystal Composition (L-2):
  Nematic liquid crystal with Δn=0.096 and NI point=143.3° C.
Liquid Crystal Composition (L-3):
  An anthraquinone-based cyan dichroic dye represented by (D-1) below, an azo-based yellow dichroic dye represented by (D-2) below, and an azo-based magenta dichroic dye NKX-3739 manufactured by Hayashibara Co., Ltd. were mixed in the following blends in a nematic liquid crystal with Δn=0.096 and NI point=143.3° C., and the dichroic dyes were dissolved to obtain a black liquid crystal composition (L-3).

Contained amount of dichroic dye with respect to 100% by mass of liquid crystal composition: 6.3% by mass
[Acetylene-Based Surfactants]
  (A-1): PD-002W, manufactured by Nissin Chemical Industry Co., Ltd.; an acetylene-based surfactant including an acetylene alcohol having an HLB value of 4 and polyoxyalkylene alkyl ether as a surfactant other than the acetylene alcohol, HLB value 9 to 10, active component 83%: all catalog values
  (A-2): Surfynol 465, manufactured by Nissin Chemical Industry Co., Ltd., HLB value 13, active component 100%: all catalog values
  (A-3): Surfynol 104PG-50, manufactured by Nissin Chemical Industry Co., Ltd., HLB value 4, active component 50%: all catalog values Comparative Example The emulsion composition was adjusted in the same manner as in Example 2, except that a non-acetylene-based surfactant (SDS: sodium dodecylbenzenesulfonate) was used instead of the acetylene-based surfactant (A-1), a liquid crystal element was created, and the optical properties before and after the durability test were measured.

The formulation table is shown in Table 2 and the optical properties before and after the durability test and the differences therein are shown in Table 3.

Reference Example

A mixed liquid of 50 parts by mass of the liquid crystal composition (L-2) and 50 parts by mass of demineralized

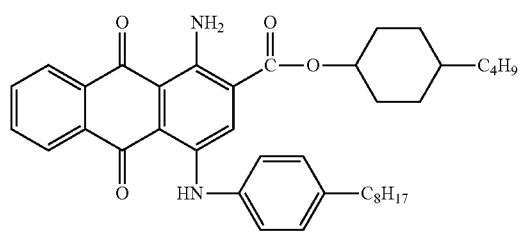
(D-1)

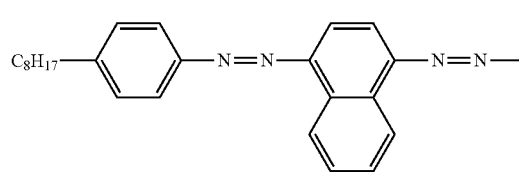
(D-2)

<Liquid Crystal Composition Blend>
  Nematic liquid crystal: 93.7% by mass
  D-1:4.3% by mass
  D-2:0.8% by mass
  NKX-3739:1.2% by mass water only, without including any surfactant, was passed through Shirasu porous glass (pore diameter 10 μm) and emulsified to try to adjust an o/w emulsion, but the mixture quickly coalesced and no emulsion composition was obtained.

TABLE 2

|  |  |  | Example 1 | Example 2 | Example 3 | Example 4 | Example 5 | Example 6 | Example 7 | Comparative Example 1 | Reference Example |
|---|---|---|---|---|---|---|---|---|---|---|---|
| o/w Emulsion (E) | Liquid crystal composition | (L-1) | 45 | | | | | | | | |
| | | (L-2) | | 50 | | | | 50 | 50 | 50 | 50 |
| | | (L-3) | | | 50 | 50 | 50 | | | | |
| | Acetylene alcohol | (A-1) | 10 | 3.5 | 3.5 | 1.7 | 6.9 | | | | |
| | | (A-2) | | | | | | 2.9 | | | |
| | | (A-3) | | | | | | | 5.7 | | |
| | SDS (Comparative Example) | | | | | | | | | 0.8 | |
| | Demineralized water | | 45 | 50 | 50 | 50 | 50 | 50 | 50 | 49.2 | 50 |
| | Subtotal | | 100 | 103.5 | 103.5 | 101.7 | 106.9 | 102.9 | 105.7 | 100 | 100 |
| White latex (W) | Polymer | Acryl | 92.7 | 92.7 | 92.7 | 92.7 | 92.7 | 92.7 | 92.7 | 92.7 | |
| | | PVA | 7.3 | 7.3 | 7.3 | 7.3 | 7.3 | 7.3 | 7.3 | 7.3 | |
| | Subtotal | | 100 | 100 | 100 | 100 | 100 | 100 | 100 | 100 | |
| Pre-emulsion (I) | o/w Emulsion | (E) | 55 | 65 | 65 | 65 | 65 | 65 | 65 | 65 | |
| | White latex | (W) | 45 | 35 | 35 | 35 | 35 | 35 | 35 | 35 | |
| | Ethylene glycol | | | 5 | 5 | 5 | 5 | 5 | 5 | 5 | |
| | Subtotal | | 100 | 105 | 105 | 105 | 105 | 105 | 105 | 105 | |
| Emulsion composition | Pre-emulsion | (I) | 100 | 98.8 | 98.8 | 98.8 | 98.8 | 98.8 | 98.8 | 98.8 | |
| | Cross-linking agent | SV-02 | | 1.2 | 1.2 | 1.2 | 1.2 | 1.2 | 1.2 | 1.2 | |
| | Subtotal | | 100 | 100 | 100 | 100 | 100 | 100 | 100 | 100 | |

TABLE 3

|  |  |  | Example 1 | Example 2 | Example 3 | Example 4 | Example 5 | Example 6 | Example 7 | Comparative Example 1 | Reference Example |
|---|---|---|---|---|---|---|---|---|---|---|---|
| | Containing surfactant acetylene-based | | Contained | Contained | Contained | Contained | Contained | Contained | Contained | None | |
| | HLB value | | 9 to 10 | 9 to 10 | 9 to 10 | 9 to 10 | 9 to 10 | 13 | 4 | 11.7 | — |
| Haze (%) | Initial | OFF | 82.2 | 96.1 | 96.6 | 97.2 | 98.7 | 96.0 | 54.5 | 85.9 | — |
| | | 50 V | — | 20.7 | 21.8 | 22.0 | 30.7 | 12.7 | 21.2 | 17.7 | — |
| | | ON | 9.7 | 6.6 | 7.8 | 8.0 | 10.7 | 4.9 | 13.7 | 5.4 | — |
| | After durability test | OFF | 85.9 | 96.4 | 96.5 | 96.8 | 97.9 | 95.6 | 53.7 | 76.4 | — |
| | | 50 V | — | 20.1 | 20.3 | 20.8 | 27.1 | 11.1 | 21.1 | 10.0 | — |
| | | ON | 10.4 | 7.0 | 8.2 | 7.9 | 10.7 | 5.1 | 13.2 | 5.0 | — |
| | ΔHaze | OFF | 3.7 | 0.2 | 0.1 | 0.3 | 0.8 | 0.4 | 0.8 | 9.5 | — |
| | | 50 V | — | 0.6 | 1.5 | 1.2 | 3.6 | 1.7 | 0.1 | 7.8 | — |
| | | ON | 0.7 | 0.4 | 0.3 | 0.0 | 0.0 | 0.2 | 0.5 | 0.5 | — |
| Total light transmittance (%) | Initial | OFF | 89.7 | 86.2 | 2.6 | 2.1 | 1.6 | 87.9 | 88.1 | 87.2 | — |
| | | 50 V | — | 87.7 | 24.0 | 22.8 | 18.9 | 88.4 | 88.1 | 88.0 | — |
| | | ON | 88.5 | 87.5 | 32.9 | 30.9 | 28.6 | 88.3 | 88.0 | 87.8 | — |
| | After durability test | OFF | 89.3 | 86.8 | 2.9 | 2.5 | 1.9 | 88.6 | 88.2 | 88.6 | — |
| | | 50 V | — | 87.6 | 24.5 | 23.0 | 20.1 | 88.4 | 88.1 | 88.0 | — |
| | | ON | 87.8 | 87.4 | 32.1 | 30.1 | 27.8 | 88.3 | 88.0 | 87.9 | — |
| | ΔTT | OFF | 0.4 | 0.6 | 0.2 | 0.4 | 0.4 | 0.7 | 0.1 | 1.4 | — |
| | | 50 V | — | 0.1 | 0.6 | 0.2 | 1.1 | 0.0 | 0.0 | 0.0 | — |
| | | ON | 0.7 | 0.1 | 0.8 | 0.9 | 0.8 | 0.0 | 0.1 | 0.0 | — |

In Examples 1 to 7, which include an acetylene alcohol, the optical performance was almost unchanged before and after the durability test and the durability at high temperatures was confirmed to be excellent.

Among the above, Examples 1 to 6, which used acetylene-based surfactant having HLB values of 5 to 15, had a high initial haze when OFF (scattering state) and excellent visual field blocking properties. In addition, the haze value difference (dynamic range) when the voltage was ON/OFF was wide and the light control function was particularly excellent.

In addition, among the above, Examples 3 to 5, which used a liquid crystal composition containing a dichroic dye, had a high haze due to light scattering by the liquid crystal component when the voltage was OFF, additionally, had reduced total light transmittance due to light absorption by the dye and were particularly excellent in the visual field blocking properties.

Meanwhile, Comparative Example 1, which did not include an acetylene alcohol, had a significant change in ΔHaze before and after the durability test and was inferior in durability at high temperatures.

In the Reference Example, which did not include a surfactant, the liquid crystal compounds coalesced during the production of the emulsion composition, making it impossible to apply the emulsion composition on the substrate.

In addition, even when the applied voltage was changed to a frequency of 100 Hz and 50 Vrms, Examples 2 to 7, which included an acetylene alcohol, had almost no change in optical performance before and after the durability test, confirming that the durability at high temperatures was excellent.

Among the above, Examples 1 to 6, which used acetylene-based surfactant having HLB values of 5 to 15, had a high initial haze when OFF (scattering state) and excellent visual field blocking properties. In addition, the haze value difference (dynamic range) when the voltage was ON/OFF was wide and the light control function was particularly excellent.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

What is claimed is:

1. A liquid crystal element comprising:
two substrates, each including a transparent conductive film, the substrates being arranged such that transparent conductive films face each other; and
a liquid crystal-polymer composite film which is sandwiched between the two substrates,
wherein the liquid crystal-polymer composite film contains an acetylene alcohol.

2. The liquid crystal element according to claim 1, wherein the liquid crystal-polymer composite film is switchable between a transparent state and a scattering state by applying a voltage.

3. The liquid crystal element according to claim 1, wherein the liquid crystal-polymer composite film contains a polymer matrix and a liquid crystal composition, and the liquid crystal composition is present in the polymer matrix.

4. The liquid crystal element according to claim 3, wherein the liquid crystal composition contains a nematic liquid crystal or a chiral nematic liquid crystal as a liquid crystal component.

5. The liquid crystal element according to claim 3, wherein a polymer forming the polymer matrix contains at least one selected from the group comprising polyurethane, polyacryl, polyvinyl alcohol, and modified products of polyurethane, polyacryl, and polyvinyl alcohol.

6. The liquid crystal element according to claim 3, wherein the liquid crystal composition contains a dichroic dye.

7. The liquid crystal element according to claim 6, wherein the dichroic dye contains at least one selected from the group comprising anthraquinone dyes and azo dyes.

8. The liquid crystal element according to claim 6, wherein an amount of the dichroic dye with respect to 100% by mass of the liquid crystal composition is 0.1% by mass or more and 20% by mass or less.

9. The liquid crystal element according to claim 1, wherein the acetylene alcohol comprises acetylene glycol.

10. The liquid crystal element according to claim 1, wherein an HLB value of the acetylene alcohol is 5 to 15.

11. The liquid crystal element according to claim 1, wherein the liquid crystal-polymer composite film contains a surfactant other than the acetylene alcohol.

12. The liquid crystal element according to claim 11, wherein an HLB value of a mixture of the acetylene alcohol and the surfactant is 5 to 15.

13. The liquid crystal element according to claim 1, wherein the substrates comprise a resin substrate.

14. An emulsion composition comprising:
a liquid crystal composition dispersed in a medium containing water,
wherein the medium is a dispersion or solution of a polymer and an acetylene alcohol.

15. The emulsion composition according to claim 14, wherein the liquid crystal composition contains a dichroic dye.

16. The emulsion composition according to claim 15, wherein the dichroic dye contains at least one selected from the group comprising anthraquinone dyes and azo dyes.

17. The emulsion composition according to claim 15, wherein a contained amount of the dichroic dye with respect to 100% by mass of the liquid crystal composition is 0.1% by mass or more and 20% by mass or less.

18. The emulsion composition according to claim 14, further comprising:
acetylene glycol as the acetylene alcohol.

19. The emulsion composition according to claim 14, wherein an HLB value of the acetylene alcohol is 5 to 15.

20. The emulsion composition according to claim 14, further comprising:
a surfactant other than the acetylene alcohol in the medium.

21. The emulsion composition according to claim 20, wherein an HLB value of a mixture of the acetylene alcohol and the surfactant is 5 to 15.

22. The emulsion composition according to claim 14, wherein the polymer contains at least one selected from the group comprising polyurethane, polyacryl, polyvinyl alcohol, and modified products of polyurethane, polyacryl, and polyvinyl alcohol.

23. A visual field blocking element including the liquid crystal element according to claim 1.

24. A visual field blocking element including the emulsion composition according to claim 14.

* * * * *